US012804373B2

(12) United States Patent
Trujillo et al.

(10) Patent No.: US 12,804,373 B2
(45) Date of Patent: Nov. 17, 2026

(54) ESTABLISH VIRTUAL GATEWAY PROTOCOL (VGP) BETWEEN VIRTUAL ROUTER AND NETWORK FUNCTION (NF)

(71) Applicant: Boost SubscriberCo L.L.C., Englewood, CO (US)

(72) Inventors: Andrew Trujillo, Littleton, CO (US); Ash Khamas, Goffstown, NH (US); Sundeep Goswami, Leesburg, VA (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 533 days.

(21) Appl. No.: 18/295,024

(22) Filed: Apr. 3, 2023

(65) Prior Publication Data

US 2023/0336965 A1 Oct. 19, 2023

Related U.S. Application Data

(60) Provisional application No. 63/331,174, filed on Apr. 14, 2022.

(51) Int. Cl.

*H04W 8/02* (2009.01)
*H04W 8/26* (2009.01)
*H04W 88/16* (2009.01)

(52) U.S. Cl.

CPC .............. *H04W 8/02* (2013.01); *H04W 8/26* (2013.01); *H04W 88/16* (2013.01)

(58) Field of Classification Search

None
See application file for complete search history.

(56) References Cited

U.S. PATENT DOCUMENTS 10,917,334 B1 * 2/2021 Lamanna .............. H04L 45/033
2022/0191131 A1 * 6/2022 Gupta ...................... H04L 43/10
2023/0164113 A1 * 5/2023 Gupta ................. H04L 61/5007 709/245
2023/0327763 A1 * 10/2023 Steeves ................. H04W 16/00 398/115

* cited by examiner

*Primary Examiner* — Wei Zhao
*Assistant Examiner* — Nam P. Cao
(74) *Attorney, Agent, or Firm* — Seed Intellectual Property Law Group LLP

(57) ABSTRACT

Embodiments are directed towards systems and methods for connecting a plurality of router devices and a plurality of network functions of a fifth-generation New Radio (5G NR) cellular telecommunication network radio access network (RAN), the plurality of network functions provided in a cloud service provider environment. One such method includes: configuring operation of Boarder Gateway Protocol (BGP) on the first virtual router device; configuring operation of BGP on a second virtual router device; configuring a first virtual private cloud (VPC) in the cloud service provider environment, the first VPC performing a first one of the network functions; and routing a first network packet to the first VPC using the first virtual router device and the second virtual router device.

13 Claims, 39 Drawing Sheets

1300-1

| Secondary IP | Primary IP | VRF-Name | Description | Interfaces | |
|---|---|---|---|---|---|
| | | Default | GRE Subnet | TenGigE0/0/0/0 | |
| | | 5GC-OAM | net-nk-sdm-oam | TenGigE0/0/0/1 | 13-1a |
| | | LI | net-nk-sdm-li | TenGigE0/0/0/2 | 13-2a |
| | | 5GC-SIGNALING | net-nk-sdm-cp1 | TenGigE0/0/0/3 | 13-3a |
| | | 5GC-SIGNALING | net-nk-sdm-cp2 | TenGigE0/0/0/4 | 13-4a |
| | | 5GC-SIGNALING | net-nk-sdm-cp3 | TenGigE0/0/0/5 | 13-5a |
| | | 5GC-SIGNALING | net-nk-sdm-trig | TenGigE0/0/0/6 | 13-6a |
| | | 5GC-SIGNALING | net-nk-sdm-http2 | TenGigE0/0/0/7 | 13-7a |
| | | 5GC-SIGNALING | net-or-multus-signaling | TenGigE0/0/0/8 | 13-8a |
| | | 5GC-SIGNALING | net-or-multus-signaling-LB | TenGigE0/0/0/9 | 13-9a |
| | | 5GC-SIGNALING | net-matrix-lb | TenGigE0/0/0/10 | 13-10a |
| | | 5GC-SIGNALING | net-matrix-multus-signal | TenGigE0/0/0/11 | 13-11a |

FIG. 13A 1300-2

| | Interfaces | Description | VRF-Name | Primary IP | Secondary IP |
|---|---|---|---|---|---|
| | TenGigE0/0/0/0 | GRE Subnet | Default | | |
| 13-1b | TenGigE0/0/0/1 | net-nk-sdm-oam | 5GC-OAM | | |
| 13-2b | TenGigE0/0/0/2 | net-nk-sdm-li | LI | | |
| 13-3b | TenGigE0/0/0/3 | net-nk-sdm-cp1 | 5GC-SIGNALING | | |
| 13-4b | TenGigE0/0/0/4 | net-nk-sdm-cp2 | 5GC-SIGNALING | | |
| 13-5b | TenGigE0/0/0/5 | net-nk-sdm-cp3 | 5GC-SIGNALING | | |
| 13-6b | TenGigE0/0/0/6 | net-nk-sdm-trig | 5GC-SIGNALING | | |
| 13-7b | TenGigE0/0/0/7 | net-nk-sdm-http2 | 5GC-SIGNALING | | |
| 13-8b | TenGigE0/0/0/8 | net-or-multus-signaling | 5GC-SIGNALING | | |
| 13-9b | TenGigE0/0/0/9 | net-or-multus-signaling-LB | 5GC-SIGNALING | | |
| 13-10b | TenGigE0/0/0/10 | net-matrix-lb | 5GC-SIGNALING | | |
| 13-11b | TenGigE0/0/0/11 | net-matrix-multus-signal | 5GC-SIGNALING | | |

FIG. 13C 1400-1

| Secondary IP | Primary IP | VRF-Name | Description | Interfaces | |
|---|---|---|---|---|---|
| | | Default | GRE Subnet | TenGigE0/0/0/0 | |
| | | 5GC-OAM | net-nk-ims-oam | TenGigE0/0/0/1 | 14-1a |
| | | LI | net-nk-ims-li | TenGigE0/0/0/2 | 14-2a |
| | | 5GC-SIGNALING | net-nk-ims-cp1 | TenGigE0/0/0/3 | 14-3a |
| | | 5GC-SIGNALING | net-nk-ims-cp2 | TenGigE0/0/0/4 | 14-4a |
| | | 5GC-SIGNALING | net-nk-ims-cp3 | TenGigE0/0/0/5 | 14-5a |
| | | 5GC-SIGNALING | net-nk-ims-resp | TenGigE0/0/0/6 | 14-6a |
| | | 5GC-SIGNALING | net-nk-ims-http2 | TenGigE0/0/0/7 | 14-7a |
| | | 5GC-IMS-UNTRUSTED- | net-data_ims_sig_untru | TenGigE0/0/0/8 | 14-8a |
| | | 5GC-IMS-UNTRUSTED INTERCONNECT | net_ISBC-IMS-DATA-SIG-UNTRU-PRIV | TenGigE0/0/0/9 | 14-9a |
| | | 5GC-IMS-UNTRUSTED-ACESS | net-data_ims_med_untru | TenGigE0/0/0/10 | 14-10a |
| | | UNTRUSTED INTERCONNECT | net-ISBC-IMS-DATA-MED-UNTRU-PRIV | TenGigE0/0/0/11 | 14-11a |
| | | 5GC-IMS-MEDIA | net-data_ims_med_tru | TenGigE0/0/0/12 | 14-12a |
| | | 5GC-IMS-MEDIA | net-data-ims_med_tru_acc | TenGigE0/0/0/13 | 14-13a |

FIG. 14A 1400-2

| | Interfaces | Description | VRF-Name | Primary IP | Secondary IP |
|---|---|---|---|---|---|
| | TenGigE0/0/0/0 | GRE Subnet | Default | | |
| 14-1b | TenGigE0/0/0/1 | net-nk-ims-oam | 5GC-OAM | | |
| 14-2b | TenGigE0/0/0/2 | net-nk-ims-li | LI | | |
| 14-3b | TenGigE0/0/0/3 | net-nk-ims-cp1 | 5GC-SIGNALING | | |
| 14-4b | TenGigE0/0/0/4 | net-nk-ims-cp2 | 5GC-SIGNALING | | |
| 14-5b | TenGigE0/0/0/5 | net-nk-imscp3 | 5GC-SIGNALING | | |
| 14-6b | TenGigE0/0/0/6 | net-nk-ims-trig | 5GC-SIGNALING | | |
| 14-7b | TenGigE0/0/0/7 | net-nk-ims-http2 | 5GC-SIGNALING | | |
| 14-8b | TenGigE0/0/0/8 | net-data_ims_sign_untru | UNTRUSTED- | | |
| 14-9b | TenGigE0/0/0/9 | PRIV | UNTRUSTED | | |
| 14-10b | TenGigE0/0/0/10 | net-data_ims_med_untru | UNTRUSTED- | | |
| 14-11b | TenGigE0/0/0/11 | UNTRU-PRIV | UNTRUSTED | | |
| 14-12b | TenGigE0/0/0/12 | net-data_ims_med_tru | 5GC-IMS-MEDIA | | |
| 14-13b | TenGigE0/0/0/13 | net-data-ims_med_tru_acc | 5GC-IMS-MEDIA | | |

FIG. 14C 1500-1

| Secondary IP | Primary IP | VRF-Name | Description | Interfaces | |
|---|---|---|---|---|---|
| | | Default | GRE Subnet | TenGigE0/0/0/0 | |
| | | 5GC-OAM | net-mv-smsc-multus-oam | TenGigE0/0/0/1 | 15-1a |
| | | 5GC-OAM | | TenGigE0/0/0/2 | 15-2a |
| | | LI | net-mv-smsc-multus-calea | TenGigE0/0/0/3 | 15-3a |
| | | 5GC-SIGNALING | net-mv-smsc-multus-sigtran1 | TenGigE0/0/0/4 | 15-4a |
| | | 5GC-SIGNALING | net-mv-smsc-multus-sigtran2 | TenGigE0/0/0/5 | 15-5a |
| | | 5GC-SIGNALING | net-mv-smsc-multus-sba | TenGigE0/0/0/6 | 15-6a |
| | | 5GC-SIGNALING | net-mv-smsc-multus-im | TenGigE0/0/0/7 | 15-7a |
| | | 5GC-SIGNALING | net-mv-smac-multus-diameter | TenGigE0/0/0/8 | 15-8a |
| | | 5GC-SIGNALING | net-mv-smsc-multus-apps | TenGigE0/0/0/9 | 15-9a |
| | | 5GC-SIGNALING | net-mv-mmsc-ds-sig | TenGigE0/0/0/10 | 15-10a |
| | | UNTRUSTED-ACESS | net-mmsc-mm1-to-upf-n6 | TenGigE0/0/0/11 | 15-11a |
| | | OP-SERVICE-MGM | net-mv-cu-mcms-op-service-mgmt | TenGigE0/0/0/12 | 15-12a |

FIG. 15A 1500-2

| | Interfaces | Description | VRF-Name | Primary IP | Secondary IP |
|---|---|---|---|---|---|
| | TenGigE0/0/0/0 | GRE Subnet | Default | | |
| 15-1b | TenGigE0/0/0/1 | TenGigE0/0/0/1 | 5GC-OAM | | |
| 15-2b | TenGigE0/0/0/2 | TenGigE0/0/0/2 | 5GC-OAM | | |
| 15-3b | TenGigE0/0/0/3 | TenGigE0/0/0/3 | LI | | |
| 15-4b | TenGigE0/0/0/4 | TenGigE0/0/0/4 | 5GC-SIGNALING | | |
| 15-5b | TenGigE0/0/0/5 | TenGigE0/0/0/5 | 5GC-SIGNALING | | |
| 15-6b | TenGigE0/0/0/6 | TenGigE0/0/0/6 | 5GC-SIGNALING | | |
| 15-7b | TenGigE0/0/0/7 | TenGigE0/0/0/7 | 5GC-SIGNALING | | |
| 15-8b | TenGigE0/0/0/8 | TenGigE0/0/0/8 | 5GC-SIGNALING | | |
| 15-9b | TenGigE0/0/0/9 | TenGigE0/0/0/9 | 5GC-SIGNALING | | |
| 15-10b | TenGigE0/0/0/10 | TenGigE0/0/0/10 | 5GC-SIGNALING | | |
| 15-11b | TenGigE0/0/0/11 | TenGigE0/0/0/11 | UNTRUSTED-ACESS | | |
| 15-12b | TenGigE0/0/0/12 | TenGigE0/0/0/12 | OP-SERVICE-MGMT | | |

FIG. 15C 1600-1

| Secondary IP | Primary IP | VRF-Name | Description | Interfaces | |
|---|---|---|---|---|---|
| | | Default | GRE Subnet | TenGigE0/0/0/0 | |
| | | 5GC-OAM | net-mv-vmas-multus-oam | TenGigE0/0/0/1 | 16-1a |
| | | 5GC-SIGNALING | net-mv-vmas-multus-sig | TenGigE0/0/0/2 | 16-2a |
| | | 5GC-SIGNALING | net-mv-vmas-multus-icm | TenGigE0/0/0/3 | 16-3a |
| | | 5GC-SIGNALING | net-mv-vmas-multus-db | TenGigE0/0/0/4 | 16-4a |
| | | 5GC-SIGNALING | net-mv-vmas-multus-sip | TenGigE0/0/0/5 | 16-5a |
| | | 5GC-SIGNALING | net-mv-vmas-multus-rest | TenGigE0/0/0/6 | 16-6a |
| | | 5GC-SIGNALING | net-mv-vmas-multus-v2t | TenGigE0/0/0/7 | 16-7a |
| | | 5GC-SIGNALING | net-mv-vmas-multus-imap | TenGigE0/0/0/8 | 16-8a |
| | | 5GC-SIGNALING | net-mv-vmas-multus-smpp | TenGigE0/0/0/9 | 16-9a |
| | | 5GC-SIGNALING | net-mv-vmas-multus-scylla | TenGigE0/0/0/10 | 16-10a |
| | | 5GC-SIGNALING | net-mv-vmas-multus-mrf | TenGigE0/0/0/11 | 16-11a |

*FIG. 16A*

1600-2

| | Interfaces | Description | VRF-Name | Primary IP | Secondary IP |
|---|---|---|---|---|---|
| 16-1b | TenGigE0/0/0/0 | GRE Subnet | Default | | |
| 16-2b | TenGigE0/0/0/1 | net-mv-vmas-multus-oam | 5GC-OAM | | |
| 16-3b | TenGigE0/0/0/2 | net-mv-vmas-multus-sig | 5GC-SIGNALING | | |
| 16-4b | TenGigE0/0/0/3 | net-mv-vmas-multus-icm | 5GC-SIGNALING | | |
| 16-5b | TenGigE0/0/0/4 | net-mv-vmas-multus-db | 5GC-SIGNALING | | |
| 16-6b | TenGigE0/0/0/5 | net-mv-vmas-multus-sip | 5GC-SIGNALING | | |
| | TenGigE0/0/0/6 | net-mv-vmas-multus-sbresta | 5GC-SIGNALING | | |
| 16-7b | TenGigE0/0/0/7 | net-mv-vmas-multus-v2t | 5GC-SIGNALING | | |
| 16-8b | TenGigE0/0/0/8 | net-mv-vmas-multus-imap | 5GC-SIGNALING | | |
| 16-9b | TenGigE0/0/0/9 | net-mv-vmas-multus-smpp | 5GC-SIGNALING | | |
| 16-10b | TenGigE0/0/0/10 | net-mv-vmas-multus-scylla | 5GC-SIGNALING | | |
| 16-11b | TenGigE0/0/0/11 | net-mv-vmas-multus-mrf | 5GC-SIGNALING | | |

FIG. 16C 1700-1

| Secondary IP | Primary IP | VRF-Name | Description | Interfaces | |
|---|---|---|---|---|---|
| | | Default | GRE Subnet | TenGigE0/0/0/0 | |
| | | 5GC-OAM | net-nk-all-oam | TenGigE0/0/0/1 | 17-1a |
| | | 5GC-SIGNALING | net-nk-amf-sig | TenGigE0/0/0/2 | 17-2a |
| | | 5GC-N2 | net-nk-amf-n2 | TenGigE0/0/0/3 | 17-3a |
| | | LI | net-nk-amf-li | TenGigE0/0/0/4 | 17-4a |
| | | 5GC-OAM | net-nk-smf-oam-lower | TenGigE0/0/0/5 | 17-5a |
| | | 5GC-OAM | net-nk-smf-oam | TenGigE0/0/0/6 | |
| | | 5GC-SIGNALING | net-nk-smf-sig-lower | TenGigE0/0/0/7 | 17-6a |
| | | 5GC-SIGNALING | net-nk-smf-sig | TenGigE0/0/0/8 | |
| | | LI | net-nk-smf-li-ower | TenGigE0/0/0/9 | 17-7a |
| | | LI | net-nk-smf-li | TenGigE0/0/0/10 | |

FIG. 17A 1700-2

| | Interfaces | Description | VRF-Name | Primary IP | Secondary IP |
|---|---|---|---|---|---|
| | TenGigE0/0/0/0 | GRE Subnet | Default | | |
| 17-1b | TenGigE0/0/0/1 | TenGigE0/0/0/1 | 5GC-OAM | | |
| 17-2b | TenGigE0/0/0/2 | TenGigE0/0/0/2 | 5GC-SIGNALING | | |
| 17-3b | TenGigE0/0/0/3 | TenGigE0/0/0/3 | 5GC-N2 | | |
| 17-4b | TenGigE0/0/0/4 | TenGigE0/0/0/4 | LI | | |
| | TenGigE0/0/0/5 | TenGigE0/0/0/5 | 5GC-OAM | | |
| | TenGigE0/0/0/6 | TenGigE0/0/0/6 | 5GC-OAM | | |
| | TenGigE0/0/0/7 | TenGigE0/0/0/7 | 5GC-SIGNALING | | |
| | TenGigE0/0/0/8 | TenGigE0/0/0/8 | 5GC-SIGNALING | | |

*FIG. 17C*

1800-1

| Secondary IP | Primary IP | VRF-Name | Description | Interfaces | |
|---|---|---|---|---|---|
| | | Default | GRE Subnet | TenGigE0/0/0/0 | |
| | | 5GC-OAM | net-nk-upf-base-lower | TenGigE0/0/0/1 | 18-1a |
| | | 5GC-OAM | net-nk-upf-base-lower | TenGigE0/0/0/2 | |
| | | 5GC-SIGNALING | net-nk-upf-sig-lower | TenGigE0/0/0/3 | 18-2a |
| | | 5GC-SIGNALING | net-nk-upf-sig | TenGigE0/0/0/4 | |
| | | LI | net-nk-upf-li-lower | TenGigE0/0/0/5 | 18-3a |
| | | LI | net-nk-upf-li | TenGigE0/0/0/6 | |
| | | 5GC-N3 | net-nk-upf-n3-lower | TenGigE0/0/0/7 | 18-4a |
| | | 5GC-N3 | net-nk-upf-n3 | TenGigE0/0/0/8 | |
| | | 5GC-4G | net-nk-upf-epc-lower | TenGigE0/0/0/9 | 18-5a |
| | | 5GC-4G | net-nk-upf-epc | TenGigE0/0/0/10 | |
| | | UNTRUSTED-ACESS | net-nk-upf-ims-lower | TenGigE0/0/0/11 | 18-6a |
| | | UNTRUSTED-ACESS | net-nk-upf-ims | TenGigE0/0/0/12 | |

FIG. 18A 1800-2

| Interfaces | Description | VRF-Name | Primary IP | Secondary IP |
|---|---|---|---|---|
| TenGigE0/0/0/0 | GRE Subnet | Default | | |
| TenGigE0/0/0/1 | TenGigE0/0/0/1 | OP-SERVICE_MGMT | | |
| TenGigE0/0/0/2 | TenGigE0/0/0/2 | TenGigE0/0/0/2 | | |
| TenGigE0/0/0/3 | TenGigE0/0/0/3 | TenGigE0/0/0/3 | | |
| TenGigE0/0/0/4 | TenGigE0/0/0/4 | TenGigE0/0/0/4 | | |
| TenGigE0/0/0/5 | TenGigE0/0/0/5 | TenGigE0/0/0/5 | | |
| TenGigE0/0/0/6 | TenGigE0/0/0/6 | TenGigE0/0/0/6 | | |
| TenGigE0/0/0/7 | TenGigE0/0/0/7 | TenGigE0/0/0/7 | | |
| TenGigE0/0/0/8 | TenGigE0/0/0/8 | TenGigE0/0/0/8 | | |
| TenGigE0/0/0/9 | TenGigE0/0/0/9 | TenGigE0/0/0/9 | | |
| TenGigE0/0/0/10 | TenGigE0/0/0/10 | TenGigE0/0/0/10 | | |
| TenGigE0/0/0/9 | TenGigE0/0/0/11 | TenGigE0/0/0/11 | | |
| TenGigE0/0/0/10 | TenGigE0/0/0/12 | TenGigE0/0/0/12 | | |

FIG. 18C

1900

| Secondary IP | Primary IP | VRF-Name | Description | Interfaces |
|---|---|---|---|---|
| | | Default | GRE Subnet | TenGigE0/0/0/0 |
| | | 5GC-OAM | net-nk-upf-oam-use1dfw1 | TenGigE0/0/0/1 |
| | | 5GC-OAM | net-nk-upf-base-use1df1-lower | TenGigE0/0/0/2 |
| | | 5GC-OAM | net-nk-upf-base-use1dfw1 | TenGigE0/0/0/3 |
| | | 5GC-SIGNALING | net-nk-upf-sing-use1dfw1-lower | TenGigE0/0/0/4 |
| | | 5GC-SIGNALING | net-nk-upf-sig-use1dfw1 | TenGigE0/0/0/5 |
| | | LI | net-nk-li-use1dfw1-lower | TenGigE0/0/0/6 |
| | | LI | net-nk-upf-li-use1dfw1 | TenGigE0/0/0/7 |
| | | 5GC-N3 | net-nk-upf-n3-lower | TenGigE0/0/0/8 |
| | | 5GC-N3 | net-nk-upf-n3 | TenGigE0/0/0/9 |
| | | 5GC-4G | net-nk-upf-epc-lower | TenGigE0/0/0/10 |
| | | 5GC-4G | net-nk-upf-epc | TenGigE0/0/0/11 |

FIG. 19

2000-1

| Secondary IP | Primary IP | VRF-Name | Description | Interfaces | |
|---|---|---|---|---|---|
| | | RAN-OAM | EXT_MAV_RAN _MPLAN | TenGigE0/0/0/8 | 20-1a |
| | | Default | TenGigE0/0/0/0 | TenGigE0/0/0/0 | |
| | | RAN-F1C | EXT_MAV_RAN _F1C_C7 | TenGigE0/0/0/1 | 20-2a |
| | | RAN-F1C | EXT_MAV_RAN _XNC_C7 | TenGigE0/0/0/2 | 20-3a |
| | | 5GC-N2 | EXT_MAV_RAN _N2_C7 | TenGigE0/0/0/3 | 20-4a |
| | | RAN-F1U | EXT_MAV_RAN _F1U_C7 | TenGigE0/0/0/4 | 20-5a |
| | | RAN-F1U | EXT_MAV_RAN _XNU_C7 | TenGigE0/0/0/5 | 20-6a |
| | | 5GC-N3 | EXT_MAV_RAN _N3_C7 | TenGigE0/0/0/6 | 20-7a |
| | | OP-SERVICE-MGMT | EXT_MAV_RAN _CU_EKS_NG | TenGigE0/0/0/7 | 20-8a |

*FIG. 20A*

2000-2

| | Interfaces | Description | VRF-Name | Primary IP | Secondary IP |
|---|---|---|---|---|---|
| 20-1b | TenGigE0/0/0/8 | EXT_MAV_RAN_MPLAN | RAN-OAM | | |
| | TenGigE0/0/0/0 | TenGigE0/0/0/0 | Default | | |
| 20-2b | TenGigE0/0/0/1 | EXT_MAV_RAN_F1C_C7 | RAN-F1C | | |
| 20-3b | TenGigE0/0/0/2 | EXT_MAV_RAN_XNC_C7 | RAN-F1C | | |
| 20-4b | TenGigE0/0/0/3 | EXT_MAV_RAN_N2_C7 | 5GC-N2 | | |
| 20-5b | TenGigE0/0/0/4 | EXT_MAV_RAN_F1U_C7 | RAN-F1U | | |
| 20-6b | TenGigE0/0/0/5 | EXT_MAV_RAN_XNU_C7 | RAN-F1U | | |
| 20-7b | TenGigE0/0/0/6 | EXT_MAV_RAN_N3_C7 | 5GC-N3 | | |
| 20-8b | TenGigE0/0/0/7 | EXT_MAV_RAN_CU_EKS_NG | OP-SERVICE-MGMT | | |

*FIG. 20C*

2100-1

| Secondary IP | Primary IP | VRF-Name | Description | Interfaces |
|---|---|---|---|---|
| | | Default | Management Subnet | TenGigE0/0/0/0 |
| | | Default | X-ENI GRE Subnet | TenGigE0/0/0/1 |
| | | 5GC-N6 | net-nk-upf-inet-lower | TenGigE0/0/0/2 |
| | | 5GC-N6 | net-nk-upf-inet | TenGigE0/0/0/3 |
| | | 5GC-N6 | net-pat-rtr-1-inet | TenGigE0/0/0/4 |

FIG. 21A 2100-2

| Secondary IP | Primary IP | VRF-Name | Description | Interfaces |
|---|---|---|---|---|
| | | Default | Management Subnet | TenGigE0/0/0/0 |
| | | Default | X-ENI GRE Subnet | TenGigE0/0/0/1 |
| | | 5GC-N6 | net-allot-rtr3-1-inet | TenGigE0/0/0/2 |
| | | 5GC-N6 | net-rtr3-1-ir-inet | TenGigE0/0/0/3 |

FIG. 21B

ESTABLISH VIRTUAL GATEWAY PROTOCOL (VGP) BETWEEN VIRTUAL ROUTER AND NETWORK FUNCTION (NF)

BACKGROUND

Technical Field

The present disclosure relates generally to telecommunication networks, more particularly, to establishing a virtual gateway protocol (VGP) between virtual router and network function (NF).

BRIEF SUMMARY

Embodiments are directed towards systems and methods for connecting a plurality of router devices and a plurality of network functions of a fifth-generation New Radio (5G NR) cellular telecommunication network radio access network (RAN), the plurality of network functions provided in a cloud service provider environment. One such method includes: configuring operation of Boarder Gateway Protocol (BGP) on the first virtual router device; configuring operation of BGP on a second virtual router device; configuring a first virtual private cloud (VPC) in the cloud service provider environment, the first VPC performing a first one of the network functions; and routing a first network packet to the first VPC using the first virtual router device and the second virtual router device.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings:

FIGS. 13A, 13B, 13C, 14A, 14B, 14C, 15A, 15B, 15C, 16A, 16B, and 16C show examples of configurations of virtual routers in an overlay network for a National Data Center (NDC) in accordance with embodiments described herein.

FIGS. 17A, 17B, 17C, 18A, 18B, and 18C show examples of configurations of virtual routers in an overlay network for a Regional Data Center (RDC) in accordance with embodiments described herein.

FIGS. 19, 20A, 20B, and 20C show examples of configurations of virtual routers in a Breakout Edge Data Center (BEDC) Direct Connect (DX) Virtual Private Cloud (VPC) in accordance with embodiments described herein.

FIGS. 21A and 21B show examples of configurations of virtual routers in a Breakout Edge Data Center (BEDC) Direct Connect (DX) Virtual Private Cloud (VPC) in accordance with embodiments described herein.

DETAILED DESCRIPTION

Figure 1:
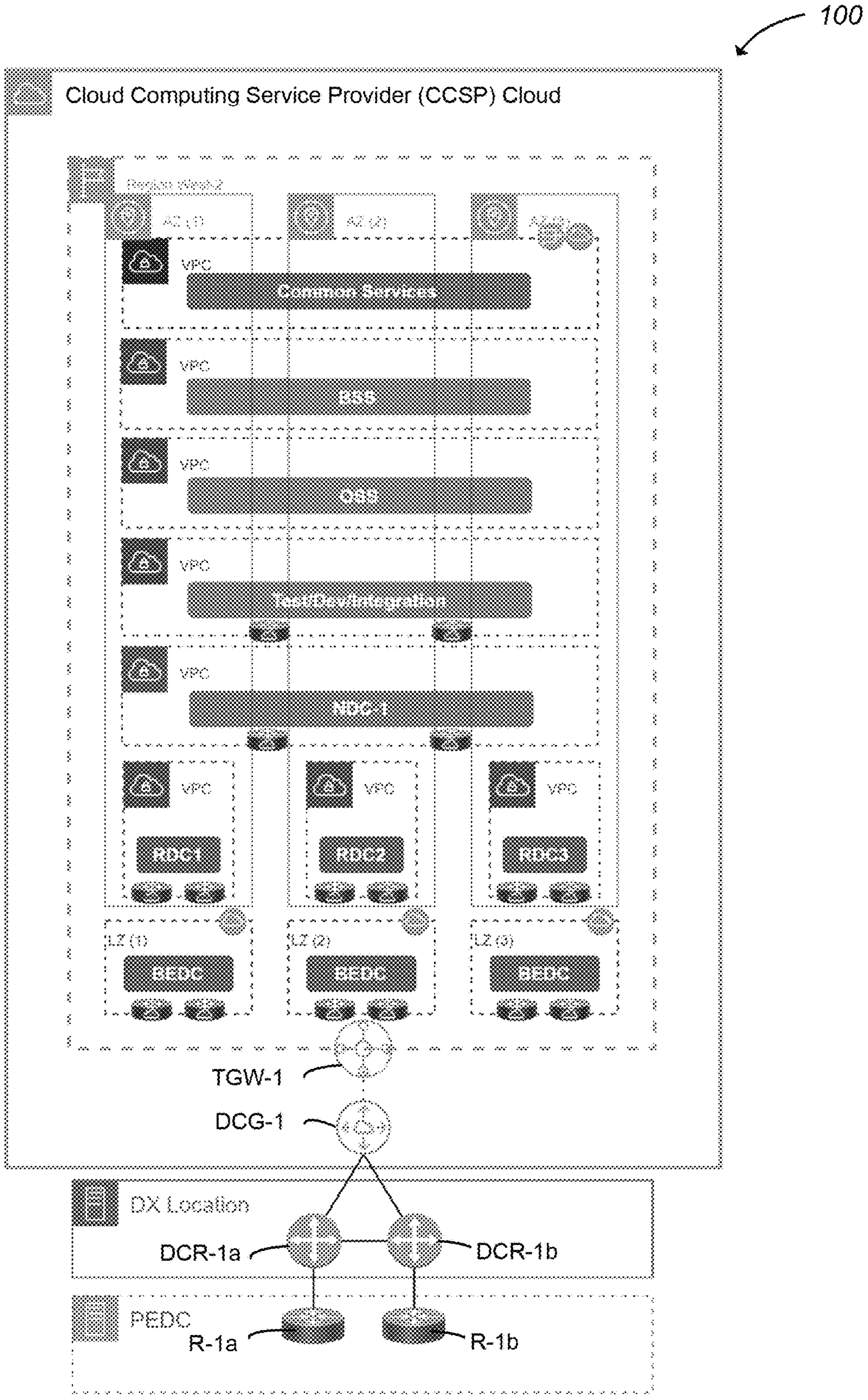
FIG. 1 shows an example of a 5G cloud architecture deployment in a cloud provided by a cloud computing service provider.

The present disclosure teaches a stand-alone, cloud-native, autonomous 5G network. In an example embodiment of the complete cloud-native 5G network disclosed herein, all functions, except components of the Radio Access Network (RAN), run in a cloud-based environment with fully automated network deployment and operations.

In one or more embodiments, a scalable 5G cloud-native network is built on a cloud-based environment provided by a cloud computing service provider. In the examples described herein, the cloud computing service provider is Amazon Web Services (AWS); however, cloud-based environments provided by other cloud computing service providers may be used without departing from the scope of the present disclosure. The AWS global infrastructure footprint is utilized, wherein native services and on-demand scalable resources to benefit from the disaggregated nature of a cloud-native 5G Core and RAN network functions. The network's cloud infrastructure is integrated with parts of the RAN network that will continue to run on-premises.

The following design guidelines were used in implementing the 5G cloud-native network: Maximize the use of cloud infrastructure and services. Enable the use of 5G components for services in multiple target environments (Dev/Test/Production/Enterprise) with full automation. Maximize the use of native automation constructs provided by a cloud computing service provider (e.g., AWS) instead of building overlay automation. Maintain the flexibility to use a mix of cloud native APIs as well as existing telecom protocols. FIG.

1 shows an example of a 5G cloud architecture deployment 100 in a cloud provided by a cloud computing service provider, such as AWS Cloud. The architecture of the 5G network leverages the distributed nature of 5G cloud-native network functions and AWS Cloud flexibility, which optimizes the placement of 5G network functions for optimal performance based on latency, throughput and processing requirements. Through this design, nationwide 5G coverage is to be provided.

The network design utilizes a logical hierarchical architecture consisting of National Data Centers (NDCs), Regional Data Centers (RDCs) and Breakout Edge Data Centers (BEDCs) to accommodate the distributed nature of 5G functions and the varying requirements for service layer integration. BEDCs are deployed in AWS Local Zones hosting 5G NFs that have strict latency budgets. They are connected with Passthrough Edge Data Centers (PEDCs), wherein each PEDC serves as an aggregation point for all Local Data Centers (LDCs) and cell sites in a particular market. BEDCs also provide internet peering for general 5G data service and enterprise customer-specific private network service.

The 5G network uses O-RAN standards in the United States. An O-RAN network consists of a RUs (Radio Units), which are deployed on towers and a DU (Distributed Unit), which controls the RUs. These units interface with a Centralized Unit (CU), which is hosted in the BEDC at the Local Zone. These combined pieces provide a full RAN solution that handles all radio level control and subscriber data traffic.

Collocated in the BEDC is the User Plane Function (UPF), which anchors user data sessions and routes to the internet. The User Plane Function (UPF) is a fundamental component of a 3GPP 5G core infrastructure system architecture. The UPF is part of a Control and User Plane Separation (CUPS) strategy, in which Packet Gateway (PGW) control and user plane functions are decoupled, which enables the data forwarding component (PGW-U) to be decentralized. This allows packet processing and traffic aggregation to be performed closer to the network edge, increasing bandwidth efficiencies while reducing network. The PGW's handling signaling traffic (PGW-C) remain in the core.

The BEDCs leverage local internet access available in AWS Local Zones, which allows for a better user experience while optimizing network traffic utilization. This type of edge capability also enables enterprise customers and end-users (gamers, streaming media and other applications) to take full advantage of 5G speeds with minimal latency. The network currently has access to 16. Local Zones across the U.S. and is continuing to expand.

The RDCs are hosted in the AWS Region across multiple availability zones. They host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, three RDCs are deployed in a region, each in a separate Availability Zone (AZ) to ensure application resiliency and high availability. An AZ is one or more discrete data centers with redundant power, networking and connectivity in an AWS Region. All AZs in an AWS Region are interconnected with high-bandwidth and low-latency networking over a fully redundant, dedicated metro fiber, which provides high-throughput, low-latency networking between AZs. CNFs (Cloud-native Network Functions) deployed in an RDC utilize an AWS high speed backbone to failover between AZs for application resiliency. CNFs like Access and Mobility Management Function (AMF) and Session Management Function (SMF), which are deployed in RDC, continue to be accessible from the BEDC in the Local Zone in case of an AZ failure. They serve as the backup CNF in the neighboring AZ and would take over and service the requests from the BEDC.

The NDCs host a nationwide global service such as a subscriber database, IP Multimedia Subsystem (IMS) (voice call), Operation Support System (OSS) and Business Support System (BSS). Each NDC is hosted in an AWS Region and spans multiple AZs for high availability. To meet geographical diversity requirements, the NDCs are mapped to AWS Regions where three NDCs are built in three U.S. Regions (us-west-2, us-east-1, and us-east2). AWS Regions us-east-1 and us-east-2 are within 15 ms while us-east-1 to us-west-2 is within 75 ms delay budget. An NDC is built to span across three AZs for high availability.

As shown in FIG. 1, a transit gateway TGW-1 is provided for a Region of a CCSP (Cloud Computing Service Provider) Cloud (e.g., AWS Cloud). In one or more implementations, the transit gateway TGW-1 is an AWS Transit Gateway that connects Amazon Virtual Private Clouds (VPCs) and on-premises networks through a central hub. The transit gateway TGW-1 is associated with a direct connect gateway DCG-1. In one or more implementations, the direct connect gateway DCG-1 is an AWS Direct Connect gateway that connects the various VPCs, and is a globally available resource that can be accessed from all other Regions of the AWS Cloud. The direct connect gateway DCG-1 is associated with Direct Connect Routers DCR-1*a* and DCR-1*b* at a Direct Connect (DX) location. The Direct Connect Routers DCR-1*a* and DCR-1*b* are connected to each other and to routers R-1*a* and R-1*b*, respectively, which are located in a Passthrough Edge Data Center PEDC.

Figure 2:
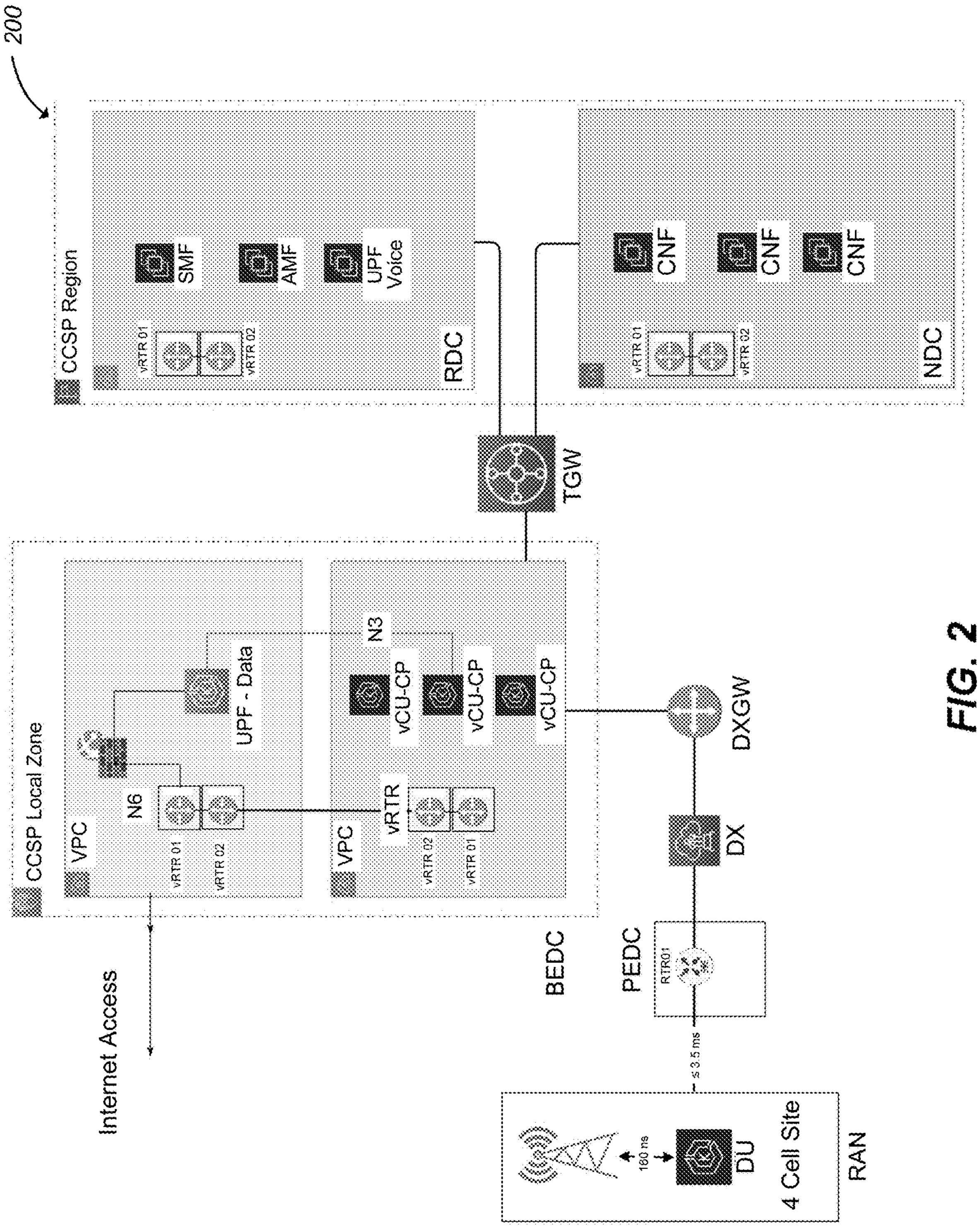
FIG. 2 shows an example of a 5G cloud infrastructure architecture in a cloud provided by a cloud computing service provider.

FIG. 2 shows an example of a 5G cloud infrastructure architecture 200 in a cloud provided by a cloud computing service provider. The 5G network architecture utilizes Amazon Virtual Private Cloud (Amazon VPC) to represent NDCs/RDCs or BEDCs (×DCs). Amazon VPC enables CNF resources to be launched on a virtual network. This virtual network is intended to closely resemble an on-premises network, but also contains all the resources needed for Data Center functions. The VPCs hosting each of the ×DCs are fully interconnected utilizing AWS global network and AWS Transit Gateway. An AWS Transit Gateway is used in AWS Regions to provide connectivity between VPCs deployed in the NDCs, RDCs, and BEDCs with scalability and resilience.

AWS Direct Connect provides connectivity from RAN DUs (on-prem) to AWS Local Zones where cell sites are homed. Cell sites are mapped to a particular AWS Local Zone based on proximity to meet 5G RAN mid-haul latency expected between DU and CU.

In the AWS network, each Region hosts one NDC and three RDCs. NDC functions communicate to each other through the Transit Gateway, where each VPC has an attachment to the specific regional Transit Gateway. EC2 (Elastic Compute Cloud) and native AWS networking is referred to as the "Underlay Network" in this network architecture. Provisioning of the Transit Gateway and required attachments are automated using CI/CD (Continuous integration/continuous delivery) pipelines with AWS APIs. Transit Gateway routing tables are utilized to maintain isolation of traffic between functions.

Some of the 5G core network functions require support for advanced routing capabilities inside VPC and across VPCs (e.g., UPF (User Plane Function), SMF and ePDG (Evolved Packet Data Gateway)). These functions reply to routing protocols such as BGP for route exchange and fast failover (both stateful and stateless). To support these requirements, virtual routers (vRouters) are deployed on EC2 to provide connectivity within and across VPCs, as well as back to the on-premises network.

Traffic from the virtual routers is encapsulated using Generic Routing Encapsulation (GRE) tunnels, creating an "Overlay Network." This leverages the Underlay network for end-point reachability. The Overlay network uses Intermediate Systems to Intermediate Systems (IS-IS) routing protocol in conjunction with Segment Routing Multi-Protocol Label Switching (SR-MPLS) to distribute routing information and establish network reachability between the virtual routers. Multi-Protocol Border Gateway Protocol (MP-BGP) over GRE is used to provide reachability from on-premises to AWS Overlay network and reachability between different regions in AWS. The combined solution provides the ability to honor requirements such as traffic isolation and efficiently route traffic between on-premises, AWS, and 3rd parties (e.g., voice aggregators, regulatory entities etc.).

AWS Direct Connect is leveraged to provide connectivity between the RAN network and the AWS Cloud. Each Local Zone is connected over 2*100G Direct Connect links for redundancy. Direct Connect in combination with Local Zone provides a sub 10 msec Midhaul connectivity between the on-premises RAN and BEDC. End-to-end SR-MPLS provides connectivity from cell sites to Local Zone and AWS region via Overlay Network using the virtual routers. This provides the ability to extend multiple Virtual Routing and Forwarding (VRF) from RAN to the AWS Cloud.

Internet access is provided by AWS within the Local Zone. A "hot potato" routing approach is the most efficient way of handling traffic, rather than backhauling traffic to the region, a centralized location or incurring the cost of maintaining a dedicated internet circuit. It improves subscriber experience and provides low latency internet. This architecture also reduces the failure domain by distributing internet among multiple Local Zones.

Figure 3:
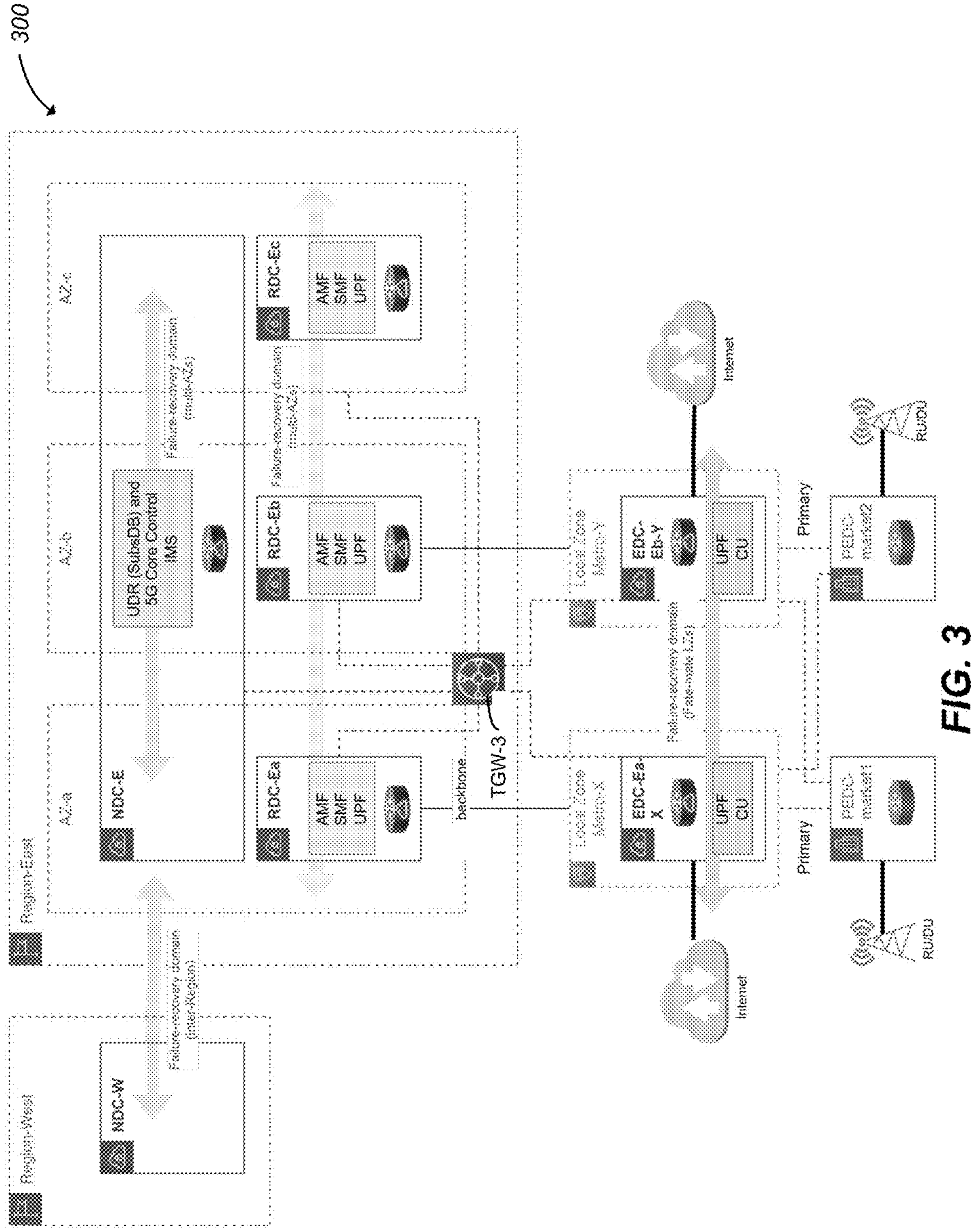
FIG. 3 shows examples of network resilience and failover scenarios.

FIG. 3 shows examples of network resilience and failover scenarios 300. In telco-grade networks, resiliency is at the heart of design. It is vital to maintain the targeted service-level agreements (SLAs), comply with regulatory requirements and support seamless failover of services. Redundancy and resiliency are addressed at various layers of the 5G stack. Transport availability in failure scenarios is discussed below. High availability and geo-redundancy are NF (Network Function) dependent, while some NFs are required to maintain state.

High availability is achieved by deploying two redundant NFs in two separate availability zones within a single VPC. Failover within an AZ can be recovered within the region without the need to route traffic to other regions. The in-region networking uses the underlay and overlay constructs, which enable on-premises traffic to seamlessly flow to the standby NF in the secondary AZ if the active NF becomes unavailable.

Geo-Redundancy is achieved by deploying two redundant NFs in two separate availability zones in more than one region. This is achieved by interconnecting all VPCs via inter-region Transit Gateway and leveraging virtual routers for overlay networking. The overlay network is built as a full-mesh enabling service continuity using the NFs deployed across NDCs in other regions during outage scenarios (e.g., Markets, B-EDCs, RDCs, in us-east-2 can continue to function using the NDC in us-east-1).

High availability and geo-redundancy are achieved by NFs failover between VPCs (multiple Availability zones) within one region. These RDCs are interconnected via Transit Gateway with the virtual-based overlay network. This provides on-premises and B-EDC reachability to the NFs deployed in each RDC with route policies in place to ensure traffic only flows to the backup RDCs, if the primary RDC becomes unreachable.

The RAN network is connected, through PEDC, to two different direct connect locations for reachability into the region and local zone. This allows for DU traffic to be rerouted from an active BEDC to backup BEDC in the event a local zone fails.

For network automation as well as scalability, infrastructure as code (IaC) was selected to enable automation. It can be tempting to create resources manually in the short term, but using infrastructure as code: enables full auditing capabilities of infrastructure deployment and changes, provides the ability to deploy a network infrastructure rapidly and at scale, and simplifies operational complexity by using code and templates as well as reduces the risk of misconfiguration.

All infrastructure components such as VPCs and subnets to transit gateways are deployed using AWS Cloud Development Kit (AWS CDK) and AWS CloudFormation templates. Both AWS CDK and Cloud Formation use parameterization and embedded code (through Lambda) to allow for automation of various environment deployments without the need to hardcode dynamic configuration information within the template.

A 5G network according to the present disclosure uses an underlay network and an overlay network. The underlay network is a physical network responsible for the delivery of packets. The overlay network is a logical network that uses network virtualization to build connectivity on top of physical infrastructure using tunneling encapsulations such as GRE (Generic Routing Encapsulation) tunnels.

Figure 4:
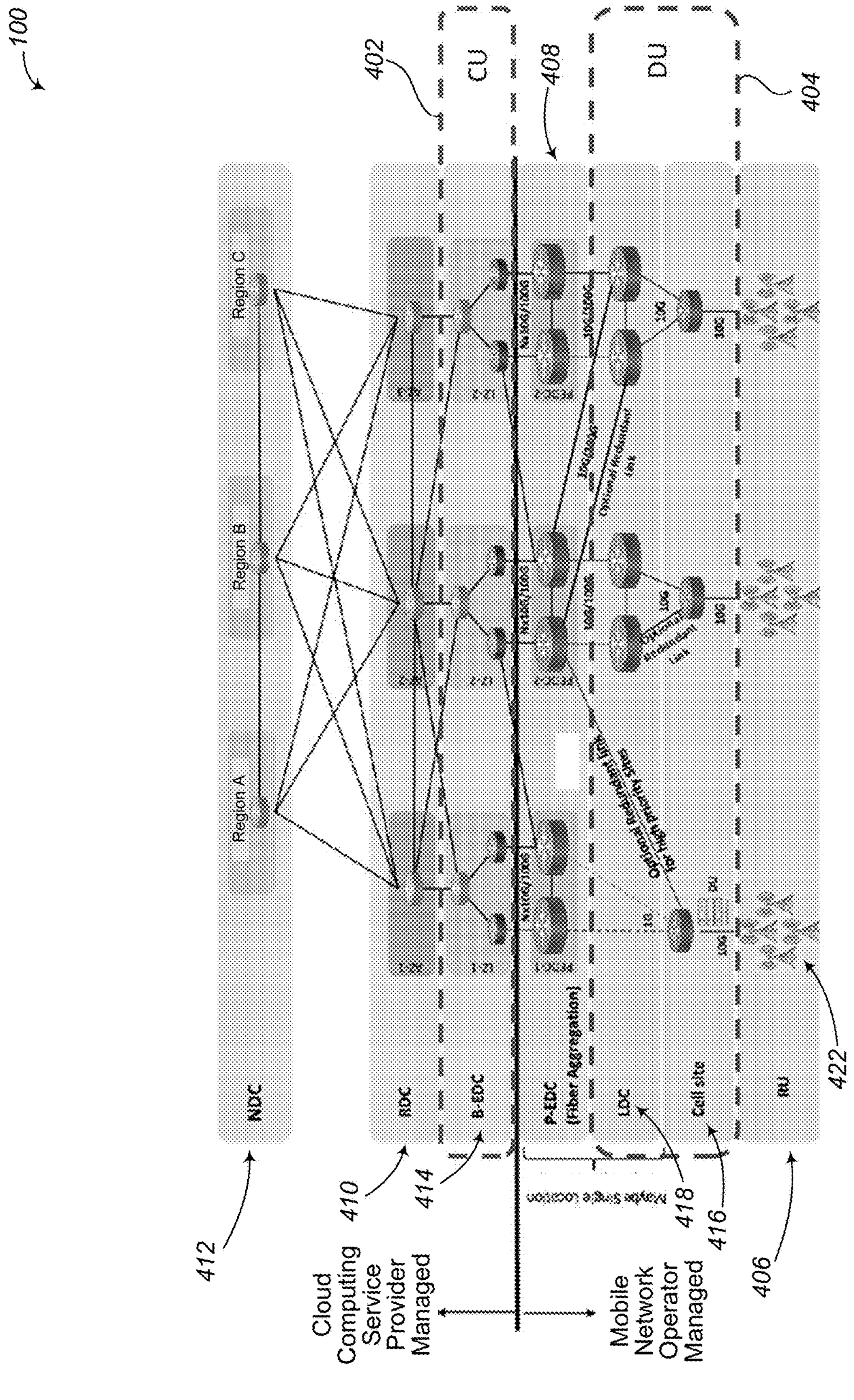
FIG. 4 illustrates a diagram of an example system architecture overview of a system in which data delivery automation of a cloud-managed wireless telecommunication network may be implemented in accordance with embodiments described herein.

FIG. 4 illustrates a diagram of an example system architecture overview of a system in which data delivery automation of a cloud-managed wireless telecommunication network may be implemented in accordance with embodiments described herein.

FIG. 4 illustrates a diagram of an example system architecture overview of a system 400 in which data delivery automation of a cloud-managed wireless telecommunication network may be implemented in accordance with embodiments described herein.

The system 400 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 4, a 5G RAN is split into DUs (e.g., DU 404) that manage scheduling of all the users and a CU 402 that manages the mobility and radio resource control (RRC) state for all the UEs. The RRC is a layer within the 5G NR protocol stack.

As shown in FIG. 4, the radio unit (RU) 406 converts radio signals sent to and from the antenna of base stations 422 into a digital signal for transmission over packet networks. It handles the digital front end (DFE) and the lower physical (PHY) layer, as well as the digital beamforming functionality.

The DU 404 may sit close to the RU 406 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 402.

The CU 402 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 402 and DU 404 depending on midhaul availability and network design. The CU 402 is a logical node that includes the gNb functions like transfer of user data, mobility control, RAN sharing, positioning, session management etc., with the exception of functions that may be allocated exclusively to the DU 404. The CU 402 controls the operation of several DUs 404 over the midhaul interface.

As mentioned above, 5G network functionality is split into two functional units: the DU 404, responsible for real time 5G layer 1 (L1) and 5G layer 2 (L2) scheduling functions, and the CU 402 responsible for non-real time, higher L2 and 5G layer 3 (L3). As shown in FIG. 4, the DU's server and relevant software may be hosted on a cell site 416 itself or can be hosted in an edge cloud (local data center (LDC) 418 or central office) depending on transport availability and fronthaul interface. The CU's server and relevant software may be hosted in a regional cloud data center or, as shown in FIG. 4, in a breakout edge data center (B-EDC) 414. As shown in FIG. 4, the DU 404 may be provisioned to communicate via a pass through edge data center (P-EDC) 408. The P-EDC 408 may provide a direct circuit fiber connection from the DU directly to the primary physical data center (e.g., B-EDC 414) hosting the CU 402. In some embodiments, the LDC 418, P-EDC 408 and/or the B-EDC 414 may be co-located or in a single location. The CU 402 may be connected to a regional cloud data center (RDC) 410, which in turn may be connected to a national cloud data center (NDC) 442. In the example embodiment, the P-EDC 408, the LDC 418, the cell site 416 and the RU 406 may all be managed and/or controlled by the mobile network operator and the B-EDC 414, the RDC 140 and the NDC 442 may all be managed and/or hosted by a cloud computing service provider. In some embodiments, the P-EDC 408, LDC 418 and cell site 416 may be at a single location or facility (e.g., a colocation data center). In other embodiments, the B-EDC 414, the P-EDC 408, the LDC 418 and cell site 416 may be at a single location or facility (e.g., a colocation data center). According to various embodiments, the actual split between DU and RU may be different depending on the specific use-case and implementation.

Figure 5:
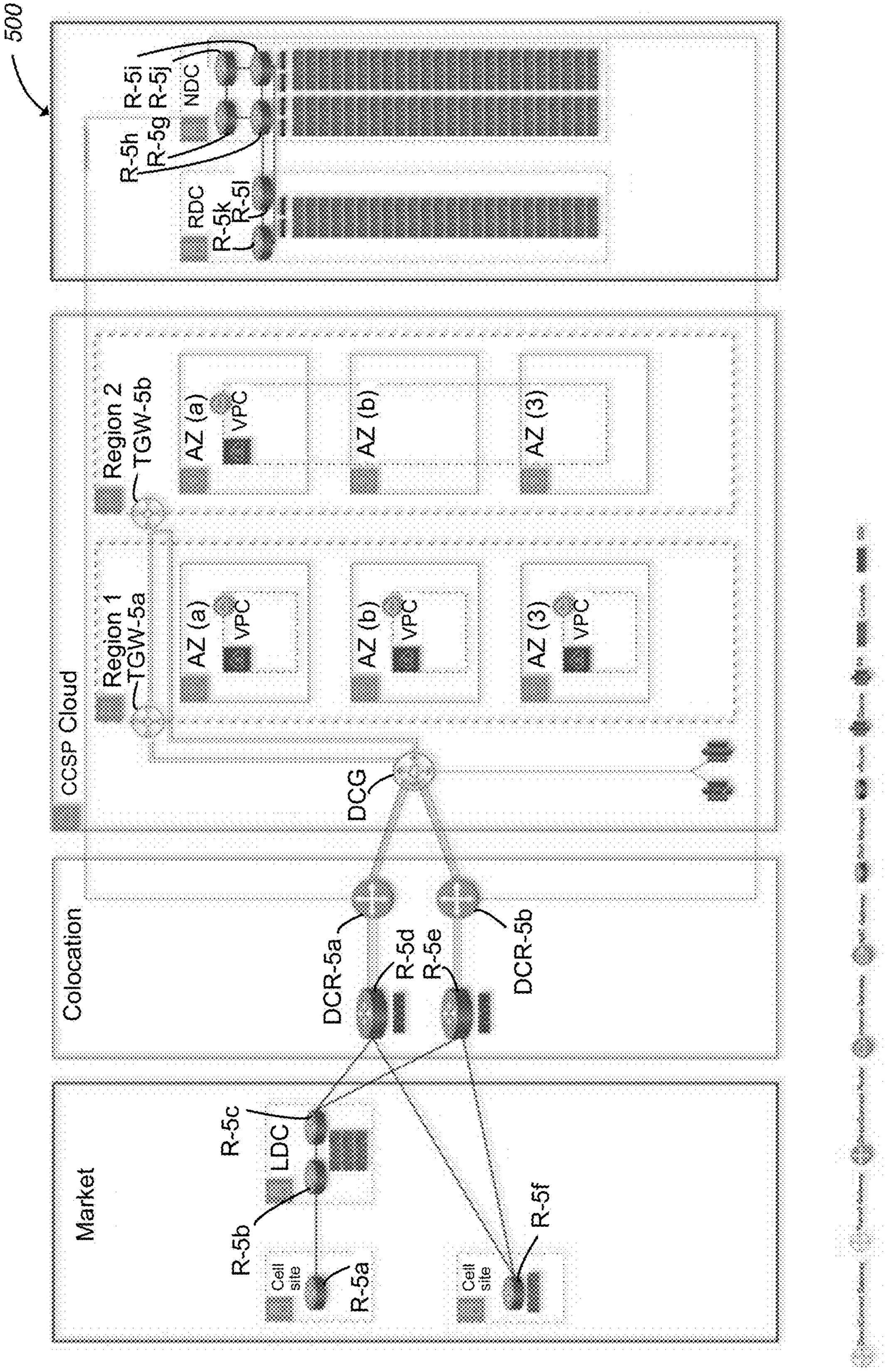
FIG. 5 shows an example of an underlay network in accordance with embodiments described herein.

FIG. 5 shows an example of an underlay network 500 in accordance with embodiments described herein. The underlay network 500 includes a router R-5*a* at a first cell site. The router R-5*a* is connected to a router R-5*b* at a local data center LDC, which is connected to a router R-5*c* at the local data center LDC. The router R-5*c* is connected to a router R-5*d* and a router R-5*e*, which are collocated and connected to a router R-5*f* at a second cell site. The routers R-5*c* and R-5*d* are respectively connected to direct connect routers DCR-5*a* and DCR-5*b*, which is connected to a direct connect gateway DCG located in a cloud computing service provider (CCSP) Cloud (e.g., AWS Cloud). The direct connect gateway DCG is connected to a transit gateway TGW-5*a* in Region 1 of the Cloud, and to a transit gateway TGW-5*b* in Region 2 of the Cloud.

In addition, the direct connect router DCR-5*a* is connected to a router R-5*g* which is located at a National Data Center NDC. The router R-5*g* is also connected to routers R-5*h*, 5-5*i*, and R-5*j*, which are also located at the Network Data Center NDC. Additionally, the routers R-5*h* is connected to a router R-5I, which is located at a Regional Data Center RDC. The routers R-5I is also connected to a router R-5K, which is also located at the Regional Data Center RDC. In addition, the router R-5*j* is connected to the direct connect router DCR-5*b*.

FIG. 5 shows only a portion of the underlay network 500. Although only one PEDC is shown in FIG. 5, the underlay network 500 includes a plurality of Passthrough Edge Data Centers PEDCs. Each Passthrough Edge Data Center PEDC has two connections to its closest Direct Connection (DX) location. In addition, each Passthrough Edge Data Center PEDC has two connections to its second closest Direct Connection (DX) locations for diversity. In addition, the site with the Regional Data Center RDC and the Network Data Center NDC has two connections to its closest Direct Connection (DX) location.

Figure 6:
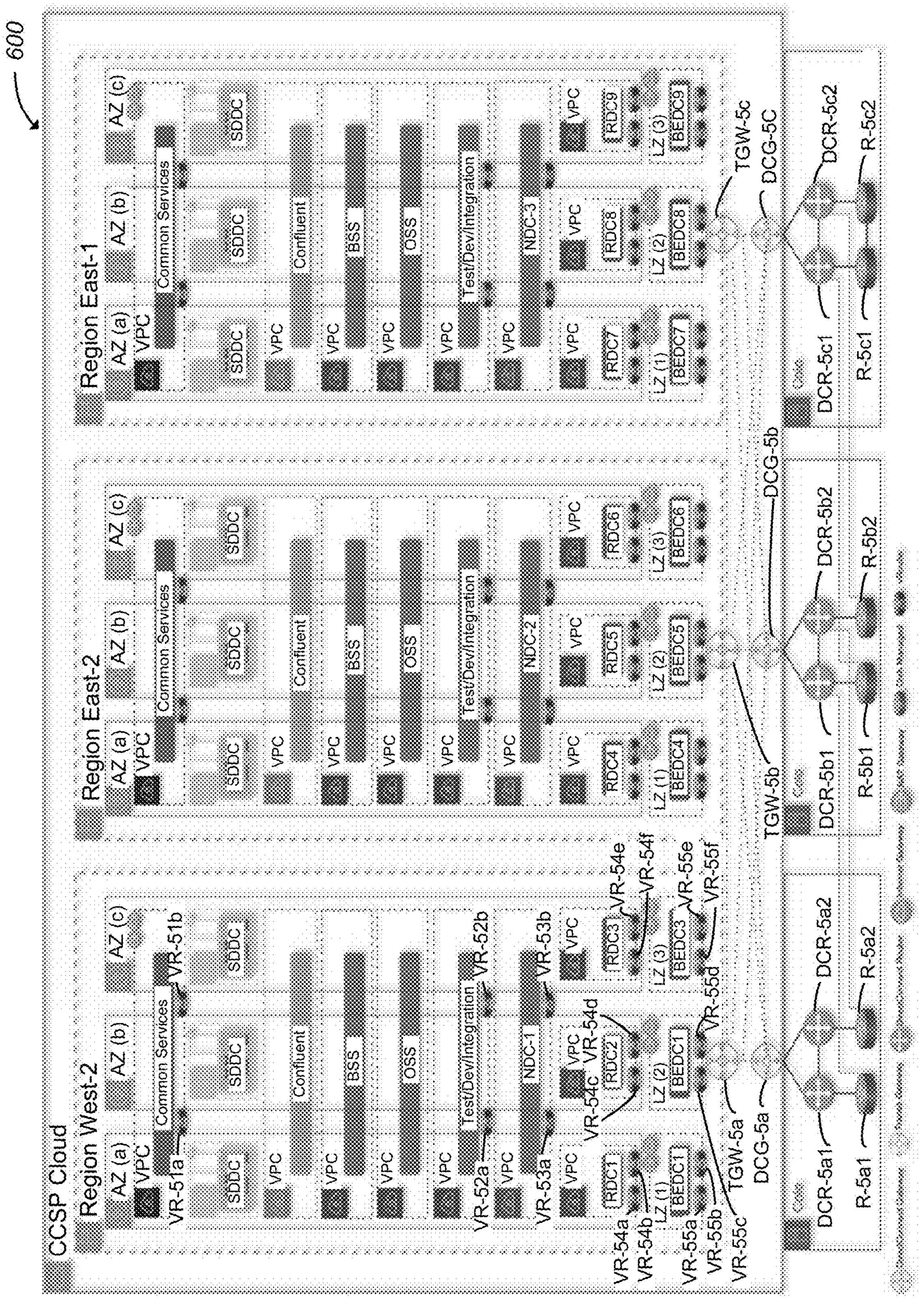
FIG. 6 shows an example of an underlay network in accordance with embodiments described herein.

FIG. 6 shows an example of an underlay network 600 in accordance with embodiments described herein. The underlay network 600 includes three regions, including Region West-2, Region East-2, and Region East-1 in a CCSP Cloud (e.g., AWS Cloud). Each Region includes three Availability Zones (AZs), including AZ (a), AZ (b), and AZ (c). A plurality of Virtual Private Clouds (VPCs) are associated with each Region. More particularly, each Region includes dedicated Virtual Private Clouds (VPCs) for each Data Center type. VPCs for common services, Confluent, BSS, OSS, Testing/Development/Integration, a National Data Center NDC are provided across the Availability Zones AZ (a), AZ (b), and AZ (c). VPCs for Regional Data Centers RDC1, RDC2, and RDC3 are provided in respective ones of the Availability Zones AZ (a), AZ (b), and AZ (c). VPCs for Breakout Edge Data Centers (BEDCs) are provided in respective ones of Local Zones LZ (1), LZ (2) and LZ (3). Each BEDC may have two VPCs, including a DX VPC and an Internet VPC. A dedicated VPC is provided per region for "ConnectedVPC" that belongs to VMware Cloud VMC. A transit gateway TGW is dedicated to each environment, with TGW peering between regions.

More particularly, a transit gateway TGW-5*a* is dedicated to Region West-2, a transit gateway TGW-5*b* is dedicated to Region East-2, and a transit gateway TGW-5*c* is dedicated to Region East-1. The transit gateway TGW-5*a* is associated with a direct connect gateway DCG-5*a*, which is connected to direct connect routers DCR-5*a*1 and DCR-5*a*2, which are connected to each other. Also, the direct connect routers DCR-5*a*1 and DCR-5*a*2 are connected to routers R-5*a*1 and R-5*a*2, respectively.

The transit gateway TGW-5*b* is associated with a direct connect gateway DCG-5*b*, which is connected to direct connect routers DCR-5*b*1 and DCR-5*b*2. The direct connect routers DCR-5*b*1 and DCR-5*b*2 are connected to each other. Also, the direct connect routers are connected to DCR-5*b*1 and DCR-5*b*2 routers R-5*b*1 and R-5*b*2, respectively.

The transit gateway TGW-5*c* is associated with a direct connect gateway DCG-5*c*, which is connected to direct connect routers DCR-5*c*1 and DCR-5*c*2. The direct connect routers DCR-5*c*1 and DCR-5*c*2 are connected to each other. Also, the direct connect routers DCR-5*c*1 and DCR-5*c*2 are connected to routers R-5*c*1 and R-5*c*2, respectively.

Additionally, the transit gateway TGW-5*a* is connected to the transit gateways TGW-5*b* and TGW-5*c* and the direct connect gateways DCG-5*b* and DCG-5*c*. The transit gateway TGW-5*b* is connected to the transit gateways TGW-5*a* and TGW-5*c* and the direct connect gateways DCG-5*a* and DCG-5*c*. The transit gateway TGW-5*c* is connected to the transit gateways TGW-5*a* and TGW-5*c* and the direct connect gateways DCG-5*a* and DCG-5*c*.

In addition, virtual routers are provided to route traffic in the underlay network 600. More particularly, a virtual router VR-51*a* is provided to route traffic between Availability Zones AZ (a) and AZ (b) in connection with the VPC for common services, and a virtual router VR-51*b* is provided to route traffic between Availability Zones AZ (b) and AZ (c) in connection with the VPC for common services. Similarly, a virtual router VR-52*a* is provided to route traffic between Availability Zones AZ (a) and AZ (b) in connection with the VPC for test/dev/integration, and a virtual router VR-52*b* is provided to route traffic between Availability Zones AZ (b) and AZ (c) in connection with the VPC for test/dev/integration. Also, a virtual router VR-53*a* is provided to route traffic between Availability Zones AZ (a) and AZ (b) in connection with the VPC for National Data Center NDC-1, and a virtual router VR-53*b* is provided to route traffic between Availability Zones AZ (b) and AZ (c) in connection with the VPC for National Data Center NDC-1.

Additionally, virtual routers VR-54*a* and VR-54*b* are provided in connection with the VPC for Regional Data Center RDC1 in Availability Zones AZ (a). Similarly, virtual routers VR-54*c* and VR-54*d* are provided in connection with the VPC for Regional Data Center RDC2 in Availability Zones AZ (b). Also, virtual routers VR-54*e* and VR-54*f* are provided in connection with the VPC for Regional Data Center RDC3 in Availability Zones AZ (c).

Further, virtual routers VR-55*a* and VR-55*b* are provided in connection with the VPC for the Breakout Edge Data Center BEDC in Local Zone LZ (1). Similarly, virtual routers VR-55*c* and VR-55*d* are provided in connection with the VPC for the Breakout Edge Data Center BEDC in Local Zone LZ (2). Also, virtual routers VR-55*e* and VR-55*f* are provided in connection with the VPC for the Breakout Edge Data Center BEDC in Local Zone LZ (1).

The underlay network 600 also includes Software-Defined Data Centers (SDDCs) in respective ones of the Availability Zones AZ (a), AZ (b), and AZ (c). The SDDCs are implemented as private clouds, which are different from the CCSP Cloud. In one or more implementations, each SDDC is implemented as a VMware Cloud (VMC).

Each of the Regions East-2 and East-2 has a configuration that is similar to the configuration of the Region West-2 described above.

Figure 7:
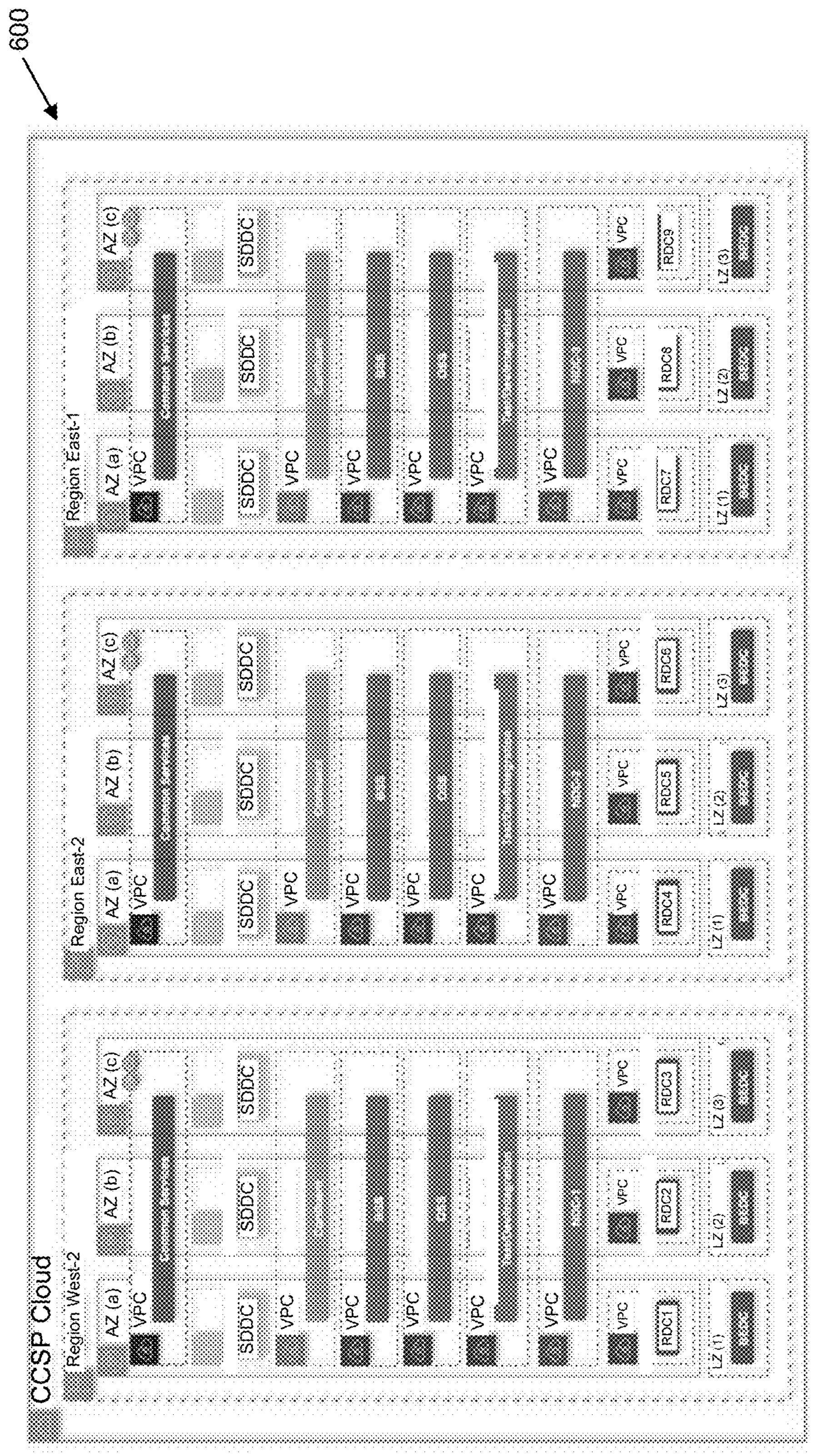
FIG. 7 shows the portion of the underlay network shown in FIG. 6 with an example of an addressing scheme in accordance with embodiments described herein.

FIG. 7 shows the portion of the underlay network 600 shown in FIG. 6 with an example of an addressing scheme in accordance with embodiments described herein. According to the addressing scheme shown in FIG. 7, IP addresses of 172.16.0.0/14 are allocated for development private IP addresses in the Region West-2, IP addresses of 172.20.0.0/14 are allocated for development private IP addresses in the Region East-2, IP addresses of 172.24.0.0/14 are allocated for development private IP addresses in the Region East-1, IP addresses of 172.28.0.0/17 are allocated for VMC development private IP addresses in the Region West-2, IP addresses of 172.28.128.0/17 are allocated for VMC development private IP addresses in the Region East-2, and IP addresses of 172.29.0.0/17 are allocated for VMC development private IP addresses in the Region East-1.

Further, IP addresses of 10.220.0.0/14 are allocated for production private IP addresses in the Region West-2, IP addresses of 10.224.0.0/14 are allocated for production private IP addresses in the Region East-2, IP addresses of 10.228.0.0/14 are allocated for production private IP addresses in the Region East-1, IP addresses of 10.232.0.0/15 are allocated for VMC production private IP addresses in the Region West-2, IP addresses of 10.234.0.0/15 are allocated for VMC production private IP addresses in the Region East-2, and IP addresses of 10.236.0.0/15 are allocated for VMC production private IP addresses in the Region East-1.

Also, IP addresses of 206.204.78.0/23 are allocated for development public IP addresses in the Region West-2, IP addresses of 206.204.80.0/23 are allocated for development public IP addresses in the Region East-2, IP addresses of 206.204.82.0/23 are allocated for development public IP addresses in the Region East-1, IP addresses of 206.204.84.0/23 are allocated for VMC development public IP addresses in the Region West-2, IP addresses of 206.204.86.0/23 are allocated for VMC development public IP addresses in the Region East-2, and IP addresses of 206.204.88.0/23 are allocated for VMC development public IP addresses in the Region East-1.

In addition, IP addresses of 206.204.64.0/22 are allocated for production public IP addresses in the Region West-2, IP addresses of 206.204.68.0/22 are allocated for production public IP addresses in the Region East-2, and IP addresses of 206.204.72.0/22 are allocated for production public IP addresses in the Region East-1.

Figure 8:
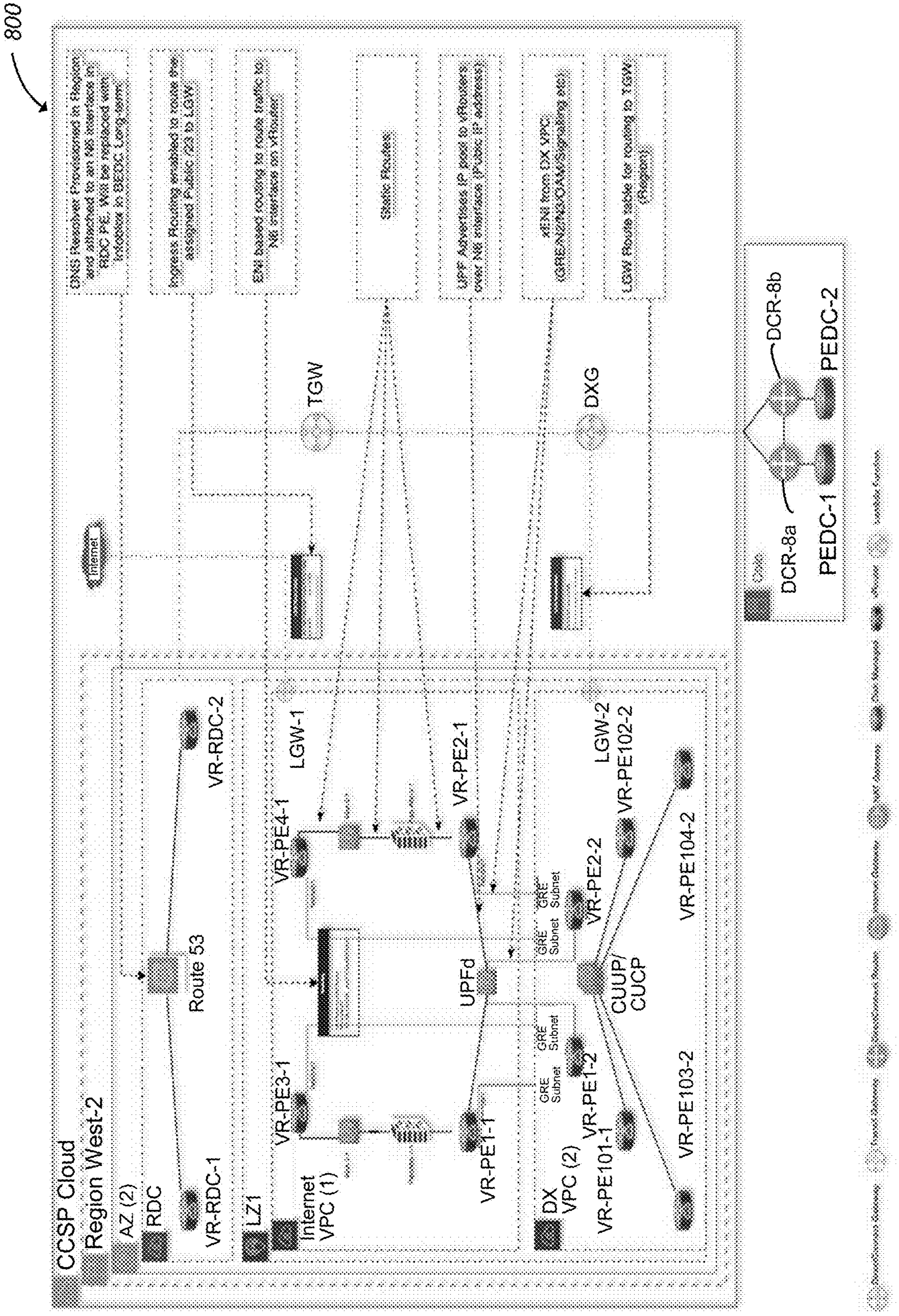
FIG. 8 shows an example of an underlay network in accordance with embodiments described herein.

FIG. 8 shows an example of an underlay network 800 in accordance with embodiments described herein. The underlay network 800 is for a Breakout Edge Data Center (BEDC). Each BEDC has two Virtual Private Clouds (VPCs), including a Direct Connect (DX) VPC and Internet VPC. The DX VPC is used to connect to a DX location and a region, RAN and UPF (except N6), and virtual routers. The Internet VPC is used for Internet Egress for UPF, Firewalls (e.g., Palo Alto Networks Network Gateway Firewall (NGFW)), Distributed Denial of Service (DDoS) protection (Allot DDoS Secure), and virtual routers.

At a RDC, a Route 53 cloud Domain Name System (DNS) web service is connected to virtual routers VR-RDC-1 and VR-RDC-2. The Route 53 cloud Domain Name System (DNS) is a DNS resolver in the Region West-2, which is attached to an N6 interface in RDC PE. The N6 interface is used in connection with the User Plane Function (UPF) in which packet Gateway (PGW) control and user plane functions are decoupled, enabling the data forwarding component (PGW-U) to be decentralized. The N6 interface is used to connect the UPF to a data network.

A local gateway LGW-1 is used in connection with the Internet VPC. The local gateway LGW-1 provides a target in VPC route tables for on-premises destined traffic, and performs network address translation (NAT) for instances that have been assigned addresses from an IP pool. The local gateway LGW-1 includes route tables and virtual interfaces (VIFs) components. The route tables enable the local gateway LGW-1 to act as a local gateway for the Internet VPC. VPC route tables associated with subnets that reside on the Internet VPC can use the local gateway LGW-1 as a route target. Ingress routing is enabled to route the assigned Public IP addresses to the local gateway LGW-1.

In addition, virtual routers VR-PE1-1, VR-PE2-1, VR-PE3-1, and VR-PE4-1 are used in connection with the Internet VPC. Each of the virtual routers VR-PE1-1, VR-PE2-1, VR-PE3-1, and VR-PE4-1 includes an interface configured for a Generic Routing Encapsulation (GRE) subnet. The Internet VPC uses Elastic Network Interface (ENI) based routing to route traffic to an N6 interface of the virtual routers. The User Plane Function (UPF) advertises an IP pool to the virtual routers. The virtual router VR-PE2-1 receives via a GRE subnet of the DX VPC×ENI, including GRE, N2, N2, OAM, and signaling.

A local gateway LGW-2 is used in connection with the Direct Connect (DX) VPC. The local gateway LGW-2 provides a target in VPC route tables for on-premises destined traffic, and performs NAT for instances that have been assigned addresses from an IP pool. The local gateway LGW-2 includes route tables and virtual interfaces (VIFs) components. The route tables enable the local gateway LGW-1 to act as a local gateway for the DX VPC. VPC route tables associated with subnets that reside on the DX VPC can use the local gateway LGW-2 as a route target. The local gateway LGW-2 includes a route table for routing to the transit gateway for the Region West-2.

The local gateway LGW-2 is connected to a transit gateway TGW, which is connected to the RDC and a Direct Connect (DX) gateway DGW. The DX gateway DGW is connected to direct connect routers DCR-8*a* and DCR-8*b*, which are connected to each other. In addition, the direct connect router DCR-8*a* is connected to a router PEDC-1, and the direct connect router DCR-8*b* is connected to a router PEDC-2.

Figure 9:
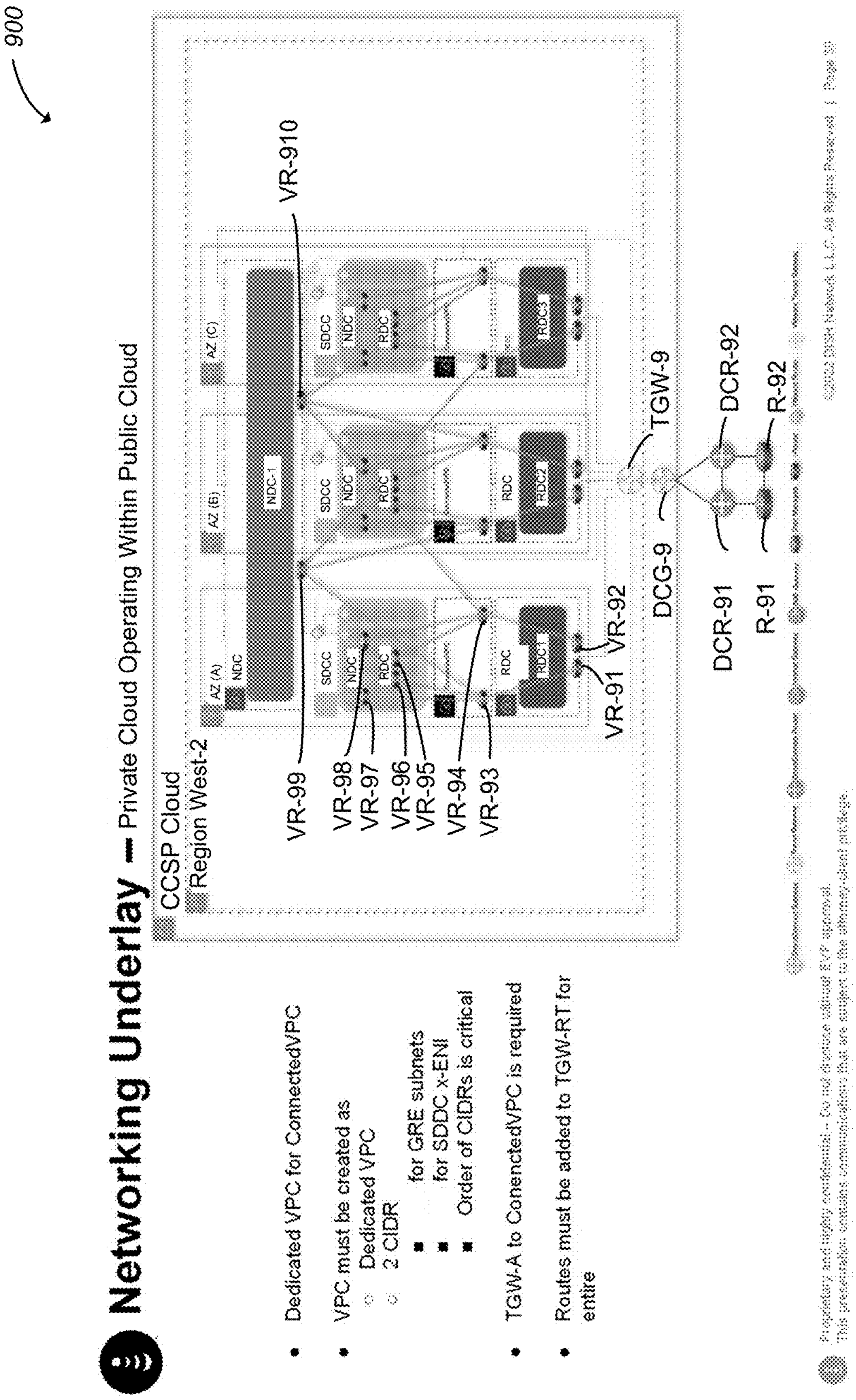
FIG. 9 shows an example of an underlay network in accordance with embodiments described herein.

FIG. 9 shows an example of an underlay network 900 in accordance with embodiments described herein. The underlay network 900 is for a VMware Cloud in the Region West-2. The underlay network 900 includes a plurality of virtual routers. More particularly, for Availability Zone (AZ) (A), virtual routers VR-91 and VR-92 are provided in a VPC for a Regional Data Center RDC1. Virtual routers VR-93 and VR-94 are provided in a ConnectedVPC. Virtual routers VR-95 and VR-96 are provided in a Regional Data Center RDC of a SDDC. Virtual routers VR-97 and VR-98 are provided in a National Data Center NDC of the SDDC. AZ (B) and AZ (C) have configurations that are similar to the configuration of the AZ (A). In addition, the underlay network 900 includes virtual routers VR-99 and VR-910 that route traffic among the ConnectedVPCs in the AZ (A), AZ (B), and AZ (C).

A transit gateway TGW-9 is connected to the respective VPCs for the Regional Data in the AZ (A), AZ (B), and AZ (C). Also, the transit gateway TGW-9 is connected to the respective ConnectedVPCs in the AZ (A), AZ (B), and AZ (C). In addition the transit gateway TGW-9 is connected to the respective ConnectedVPCs in the AZ (A), AZ (B), and AZ (C). Additionally, the transit gateway TGW-9 is connected to direct connect routers DCR-91 and DCR-92. The direct connect routers DCR-91 and DCR-92 are connected to each other. In addition, direct connect router DCR-91 is connected to a router R-91, and DCR-92 direct connect router DCR-92 is connected to a router R-92.

A dedicated VPC is used for each ConnectedVPC. The VPC uses Classless inter-Domain Routing (CIDR). A first CIDR prefix length is used for GRE subnets. A second CIDR prefix length is used for SDDC×-ENI. The Order of CIDRs is critical. In order to connect the transit gateway TGW-9 to each ConnectedVPC, a routing table of the transit gateway TGW-9 must include routes for the subnet with a third CIDR prefix length.

Figure 10:
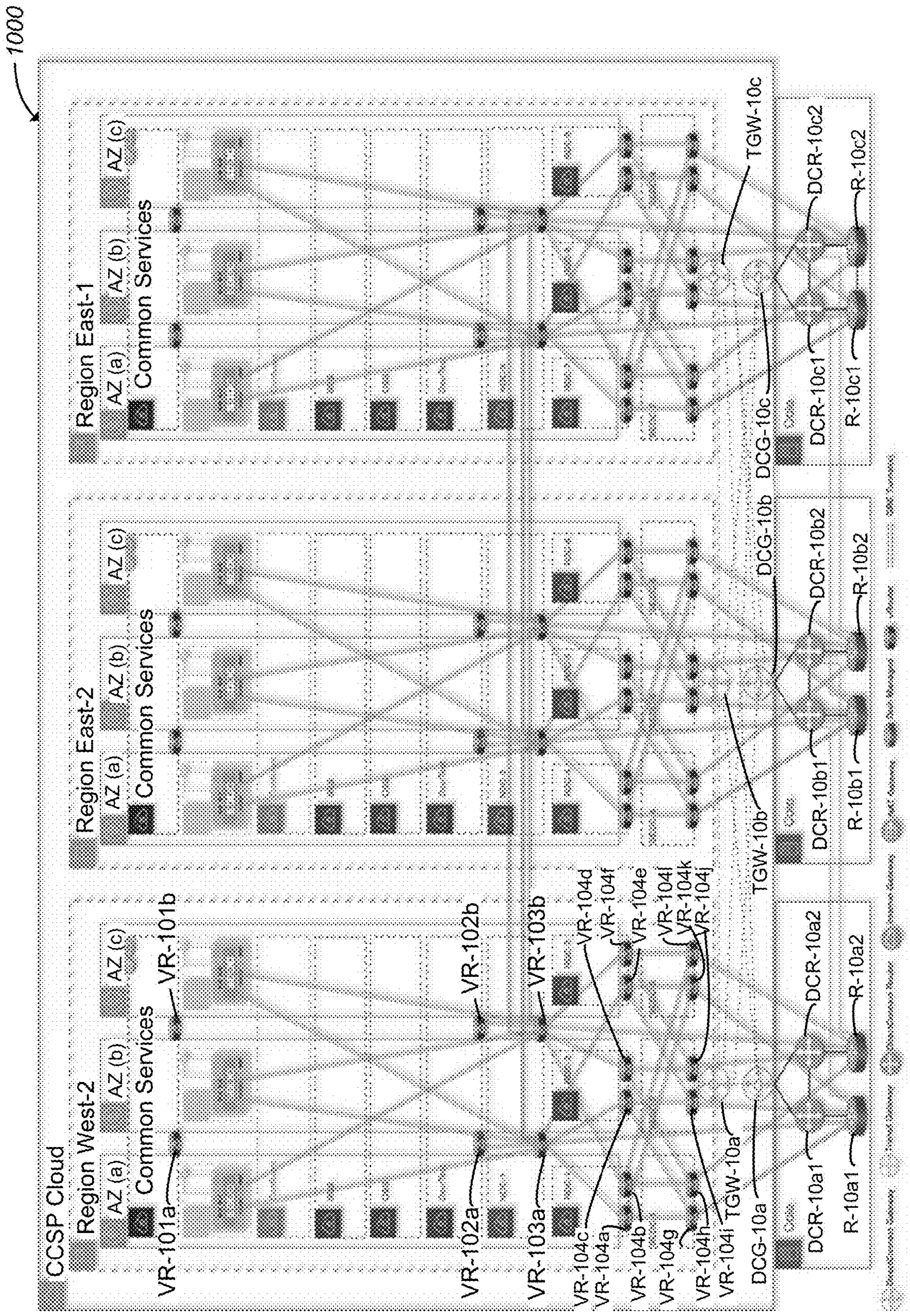
FIG. 10 shows an example of an overlay network in accordance with embodiments described herein.

FIG. 10 shows an example of an overlay network 1000 in accordance with embodiments described herein. The overlay network 1000 includes three regions, including Region West-2, Region East-2, and Region East-1 in a CCSP Cloud (e.g., AWS Cloud). Each Region includes three Availability Zones (AZs), including AZ (a), AZ (b), and AZ (c). A plurality of Virtual Private Clouds (VPCs) are associated with each Region. More particularly, each Region includes dedicated Virtual Private Clouds (VPCs) for each Data Center type. VPCs for common services, Confluent, BSS, OSS, Testing/Development/Integration, a National Data Center NDC are provided across the Availability Zones AZ (a), AZ (b), and AZ (c). VPCs for Regional Data Centers RDC-1, RDC-2, and RDC-3 are provided in respective ones of the Availability Zones AZ (a), AZ (b), and AZ (c). VPCs for Breakout Edge Data Centers BEDC-1, BEDC-2, BEDC-3 are provided in respective ones of the Availability Zones AZ (a), AZ (b), and AZ (c).

A transit gateway TGW-10*a* is dedicated to Region West-2, a transit gateway TGW-10*b* is dedicated to Region East-2, and a transit gateway TGW-10*c* is dedicated to Region East-1. The transit gateway TGW-10*a* is associated with a direct connect gateway DCG-10*a*, which is connected to direct connect routers DCR-10*a*1 and DCR-10*a*2. The direct connect routers DCR-10*a*1 and DCR-10 are connected to each other. Also, the direct connect routers DCR-10*a*1 and DCR-10*a*2 are connected to routers R-10*a*1 and R-10*a*2, respectively.

The transit gateway TGW-10*b* is associated with a direct connect gateway DCG-10*b*, which is connected to direct connect routers DCR-10*b*1 and DCR-10*b*2. The direct connect routers DCR-10*b*1 and DCR-10*b*2 are connected to each other. Also, the direct connect routers DCR-10*b*1 and DCR-10*b*2 are connected to routers R-10*b*1 and R-10*b*2, respectively.

The transit gateway TGW-10*c* is associated with a direct connect gateway DCG-10*c*, which is connected to direct connect routers DCR-10*c*1 and DCR-10*c*2. The connect routers DCR-10*c*1 and DCR-10*c*2 are connected to each other. Also, the connect routers DCR-10*c*1 and DCR-10*c*2 are connected to routers R-10*c*1 and R-10*c*2, respectively.

Additionally, the transit gateway TGW-10*a* is connected to the transit gateways TGW-10*b* and TGW-10*c* and the direct connect gateways DCG-10*b* and DCG-10*c*. The transit gateway TGW-10*b* is connected to the transit gateways TGW-10*a* and TGW-10*c* and the direct connect gateways DCG-10*a* and DCG-10*c*. The transit gateway TGW-10*c* is connected to the transit gateways TGW-10*a* and TGW-10*c* and the direct connect gateways DCG-10*a* and DCG-10*c*.

In addition, virtual routers are provided to route traffic in the overlay network 1000. More particularly, a virtual router VR-101*a* is provided to route traffic between Availability Zones AZ (a) and AZ (b) in connection with the VPC for common services, and a virtual router VR-101*b* is provided to route traffic between Availability Zones AZ (b) and AZ (c) in connection with the VPC for common services. Similarly, a virtual router VR-102*a* is provided to route traffic between Availability Zones AZ (a) and AZ (b) in connection with the VPC for dev/test, and a virtual router VR-102*b* is provided to route traffic between Availability Zones AZ (b) and AZ (c) in connection with the VPC for dev/test. Also, a virtual router VR-103*a* is provided to route traffic between Availability Zones AZ (a) and AZ (b) in connection with the VPC for National Data Center NDC-1, and a virtual router VR-103*b* is provided to route traffic between Availability Zones AZ (b) and AZ (c) in connection with the VPC for National Data Center NDC-1.

Additionally, virtual routers VR-104*a* and VR-104*b* are provided in connection with the VPC for Regional Data Center RDC-1 in Availability Zones AZ (a). Similarly, virtual routers VR-104*c* and VR-104*d* are provided in connection with the VPC for Regional Data Center RDC2 in Availability Zones AZ (b). Also, virtual routers VR-104*e* and VR-104*f* are provided in connection with the VPC for Regional Data Center RDC3 in Availability Zones AZ (c).

The overlay network 1000 also includes Software-Defined Data Centers (SDDCs) in respective ones of the Availability Zones AZ (a), AZ (b), and AZ (c). The SDDCs are implemented as private clouds, which are different from the CCSP Cloud. In one or more implementations, each SDDC is implemented as a VMware Cloud (VMC).

Each of the Regions East-2 and East-2 has a configuration that is similar to the configuration of the Region West-2 described above.

In the overlay network 1000, GRE tunnels are built as a Point-to-Point tunes. Odd virtual routers in the NDC will have a single GRE tunnel to odd RRs. Even virtual routers in the NDC will have a single GRE tunnel to even RRs. GRE tunnels are built across VPCs for BEDC, RDC, and NDC. Odd virtual routers in DX VPC in BEDC will have GRE tunnels to odd virtual routers in RDC. Even virtual routers in DX VPC in BEDC will have GRE tunnels to Even virtual routers in RDC. Odd virtual routers in RDC will have GRE tunnels to odd virtual routers in NDC. Even virtual routers in RDC will have GRE tunnels to even virtual routers in NDC.

Figure 11:
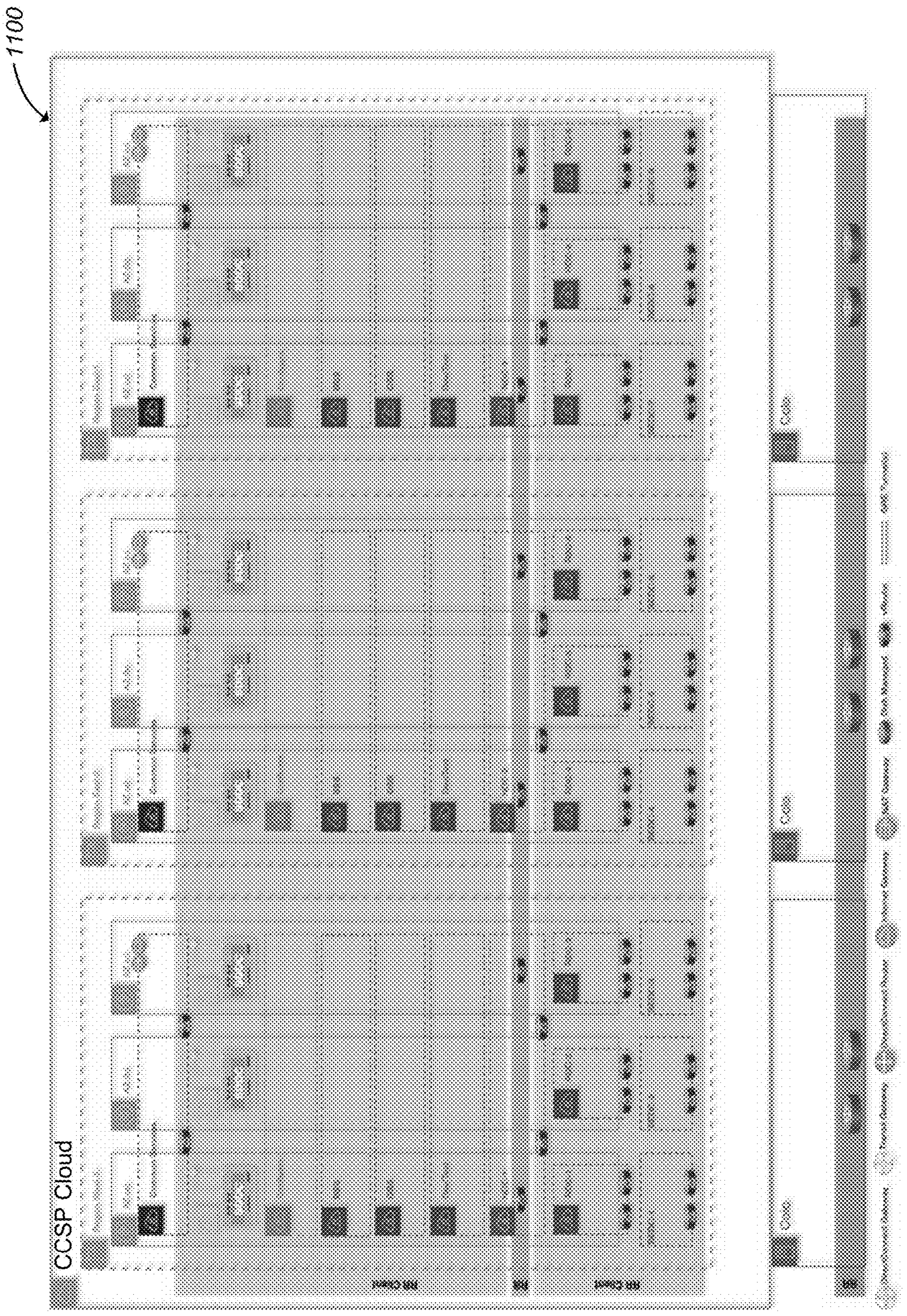
FIG. 11 shows an example of Border Gateway Protocol (BGP) route-reflectors in an overlay network in accordance with embodiments described herein.

FIG. 11 shows an example of Border Gateway Protocol (BGP) route-reflectors in an overlay network 1100 in accordance with embodiments described herein. The overlay network 1100 is similar in many relevant respects to the overlay network 1000 shown in FIG. 10. Each has two Route Reflectors in NDC in separate AZs. All Route-Reflectors are fully meshed. Route-Reflectors in the CCSP Cloud (e.g., AWS Cloud) serve as a Route-Reflector to PEDC. PEDC serves as Route-Reflector client to its respective market.

Figure 12:
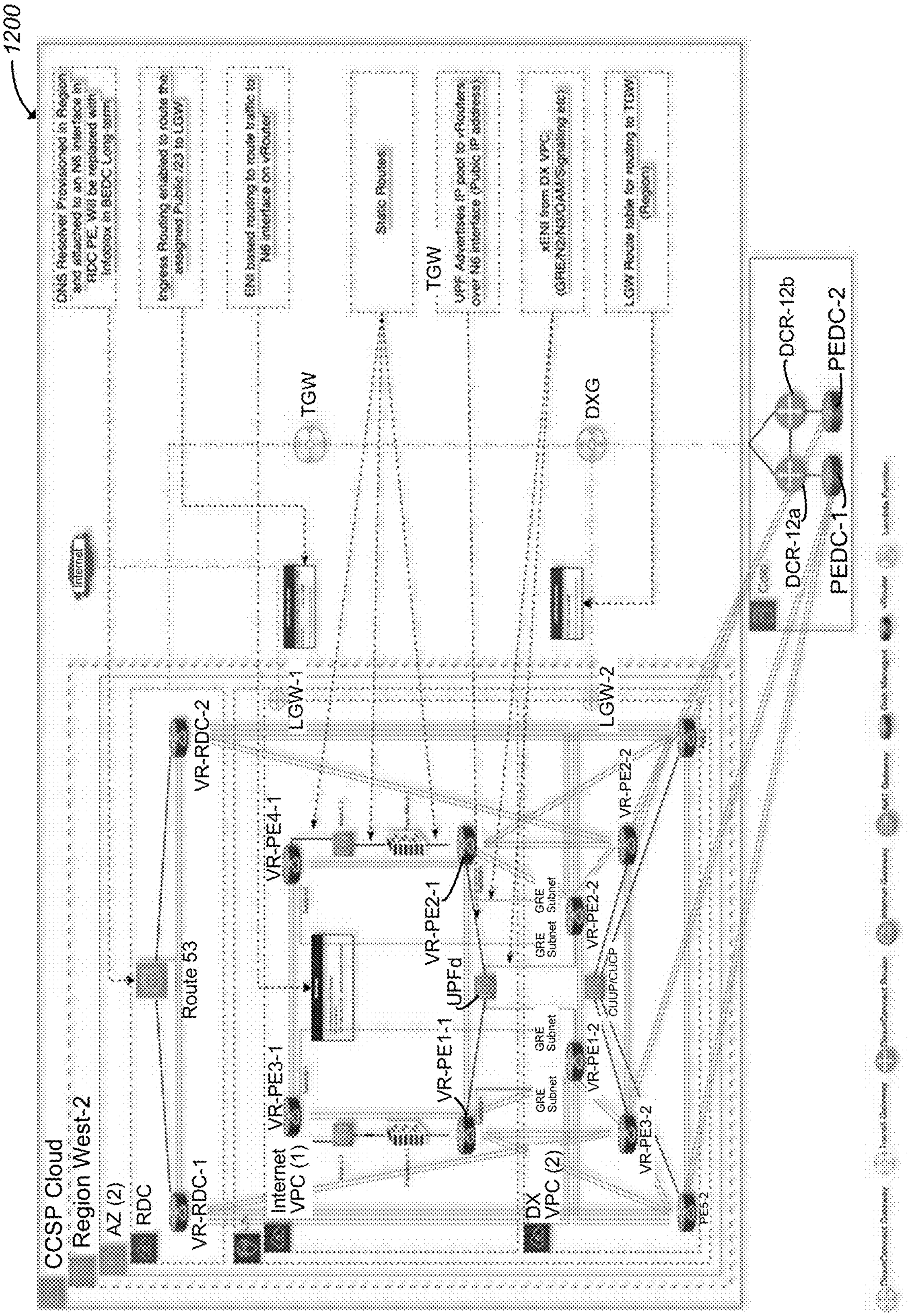
FIG. 12 shows an example of an overlay network in accordance with embodiments described herein.
Figure 13B:
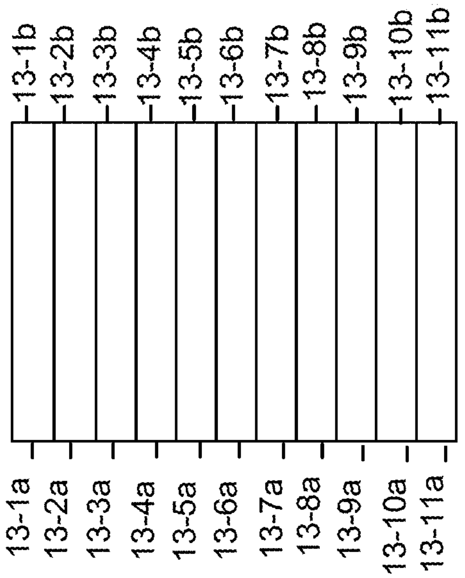
Figure 14B:
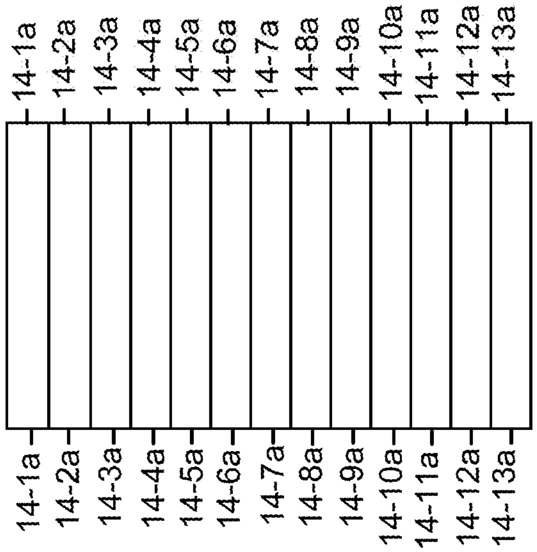
Figure 15B:
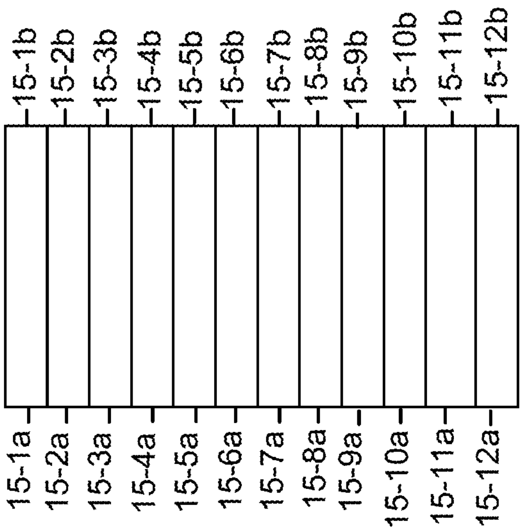
Figure 16B:
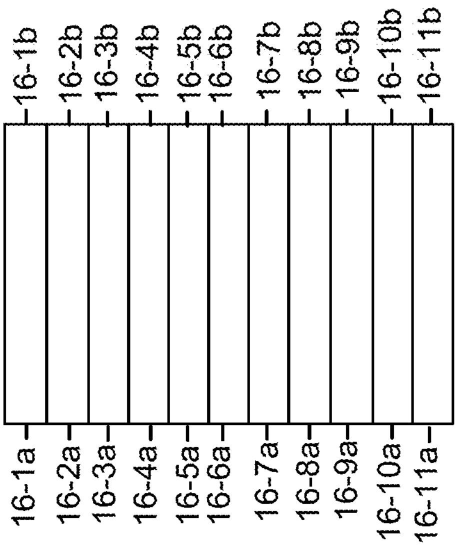
Figure 17B:
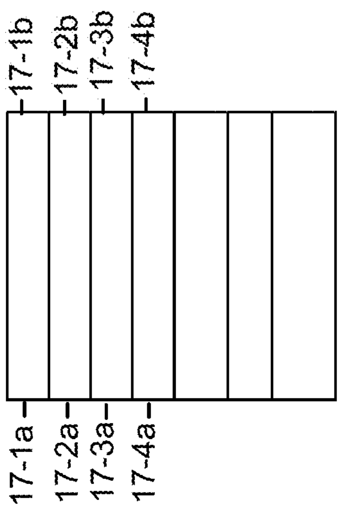
Figure 18B:
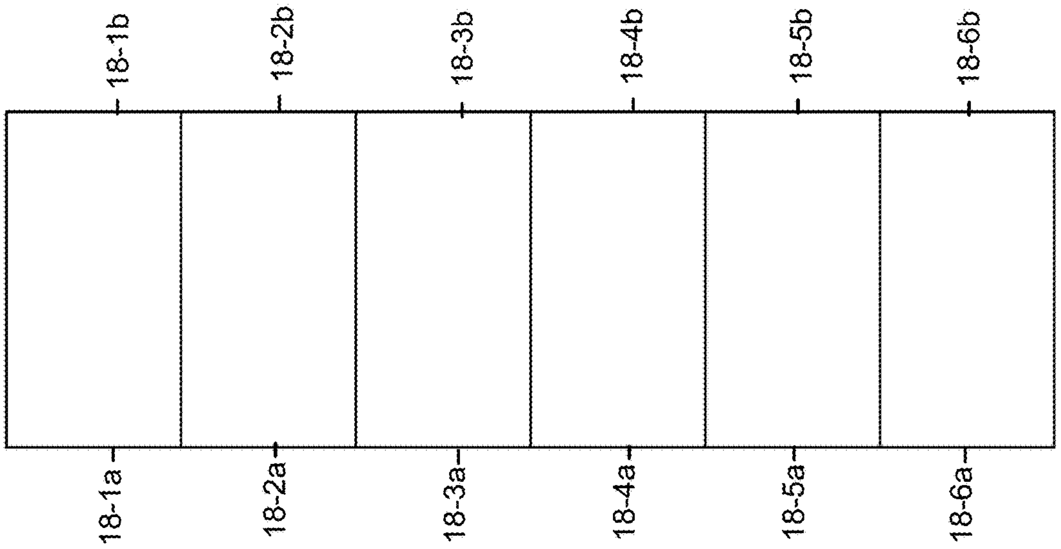

FIG. 12 shows an example of an overlay network 1200 in accordance with embodiments described herein. The overlay network 1200 is for a Breakout Edge Data Center (BEDC). Each BEDC has two Virtual Private Clouds (VPCs), including a Direct Connect (DX) VPC and Internet VPC. The DX VPC is used to connect to a DX location and a region, RAN and UPF (except N6), and virtual routers. The Internet VPC is used for Internet Egress for UPF, Firewalls (e.g., Palo Alto Networks Network Gateway Firewall (NGFW)), Distributed Denial of Service (DDoS) protection (Allot DDoS Secure), and virtual routers.

At a RDC, a Route 53 cloud Domain Name System (DNS) web service is connected to virtual routers VR-RDC-1 and VR-RDC-2. The Route 53 cloud Domain Name System (DNS) is a DNS resolver in the Region West-2, which is attached to an N6 interface in RDC PE. The N6 interface is used in connection with the User Plane Function (UPF) in which packet Gateway (PGW) control and user plane functions are decoupled, enabling the data forwarding component (PGW-U) to be decentralized. The N6 interface is used to connect the UPF to a data network.

A local gateway LGW-1 is used in connection with the Internet VPC. The local gateway LGW-1 provides a target in VPC route tables for on-premises destined traffic, and performs network address translation (NAT) for instances that have been assigned addresses from an IP pool. The local gateway LGW-1 includes route tables and virtual interfaces (VIFs) components. The route tables enable the local gateway LGW-1 to act as a local gateway for the Internet VPC. VPC route tables associated with subnets that reside on the Internet VPC can use the local gateway LGW-1 as a route target. Ingress routing is enabled to route the assigned Public IP addresses to the local gateway LGW-1.

In addition, virtual routers VR-PE1-1, VR-PE2-1, VR-PE3-1, and VR-PE4-1 are used in connection with the Internet VPC. Each of the virtual routers VR-PE1-1, VR-PE2-1, VR-PE 3-1, and VR-PE4-1 includes an interface configured for a Generic Routing Encapsulation (GRE) subnet. The Internet VPC uses Elastic Network Interface (ENI) based routing to route traffic to an N6 interface of the virtual routers. The User Plane Function (UPF) advertises an IP pool to the virtual routers. The virtual router VR-PE2-1 receives via a GRE subnet of the DX VPC×ENI, including GRE, N2, N2, OAM, and signaling.

A local gateway LGW-2 is used in connection with the Direct Connect (DX) VPC. The local gateway LGW-2 provides a target in VPC route tables for on-premises destined traffic, and performs NAT for instances that have been assigned addresses from an IP pool. The local gateway LGW-2 includes route tables and virtual interfaces (VIFs) components. The route tables enable the local gateway LGW-1 to act as a local gateway for the DX VPC. VPC route tables associated with subnets that reside on the DX VPC can use the local gateway LGW-2 as a route target. The local gateway LGW-2 includes a route table for routing to the transit gateway for the Region West-2.

The local gateway LGW-2 is connected to a transit gateway TGW, which is connected to the RDC and a Direct Connect (DX) gateway DGW. The DX gateway DGW is connected to direct connect routers DCR-12*a* and DCR-12*b*, which are connected to each other. In addition, the direct connect router DCR-12*a* is connected to a router PEDC-1, and the direct connect router DCR-12*b* is connected to a router PEDC-2.

FIGS. 13A, 13B, 13C, 14A, 14B, 14C, 15A, 15B, 16C, 16A, 16B, and 16C show examples of configurations of virtual routers in an overlay network for a National Data Center (NDC) in accordance with embodiments described herein. The configuration for each virtual router includes information that identifies a plurality of network interfaces, and information regarding those network interfaces. For example, the regarding each network interface includes a primary IP address, a secondary IP address, a Virtual routing and Forwarding (VRF) name, and a description.

More particularly, FIG. 13A shows an example of a configuration of a virtual router 1300-1. As shown in FIG. 13, a first network interface is configured as a default VRF interface, a second network interface is configured for routing Operations, Administration, and Management (OAM) traffic, a third network interface is configured for routing Lawful Intercept (LI) traffic, and seven network interfaces configured for routing 5G signaling traffic.

FIGS. 14A, 14B, 14C, 15A, 15B, 16C, 16A, 16B, and 16C show configuration of virtual router 1400-1, 1400-2, 1500-1, 1500-2, 1600-1, 1600-2, 1700-1, 1700-2, 1800-1, 1800-2, 1900, 2000-1, 2000-2, 2100-1, and 2100-1. As shown in FIGS. 14A, 14B, 14C, 15A, 15B, 16C, 16A, 16B, and 16C, the other virtual routers in the overlay network for the NDC are configured for various types of 5G traffic, including various types of 5G signaling traffic.

The network interfaces configured for routing 5G signaling traffic include network interfaces for routing various types of Subscriber Data Management (SDM) traffic, Multus traffic. GRE interfaces are unique per virtual router. All VRF interworking for third party connectivity must take in on-premises firewall in a PEDC. Highest IP address is assigned as Secondary address serving as a default gateway. Second highest IP address is assigned to the Primary vRouter. Third highest IP address is assigned to the Secondary vRouter.

FIGS. 17A, 17B, 17C, 18A, 18B, and 18C show examples of configurations of virtual routers in an overlay network for a Regional Data Center (RDC) in accordance with embodiments described herein. More particularly, FIGS. 17A, 17B, 17C, 18A, 18B, and 18C show examples of configurations virtual router 1700-1, 1800-1, 1800-2, 1900, 2000-1. As shown in FIGS. 17A, 17B, 17C, 18A, 18B, and 18C, the other virtual routers in the overlay network for the RDC are configured for various types of 5G traffic, including various types of 5G signaling traffic. Highest IP address is assigned as Secondary address serving as a default gateway. Second highest IP address is assigned to the Primary vRouter. Third highest IP address is assigned to the Secondary vRouter. For SMF/UPF, a single subnet is created as a first CIDR prefix while configured on 2 ENIs as a second CIDR prefix. These subnets are considered Point-to-Point, no default gateway is defined/required.

Figure 20B:
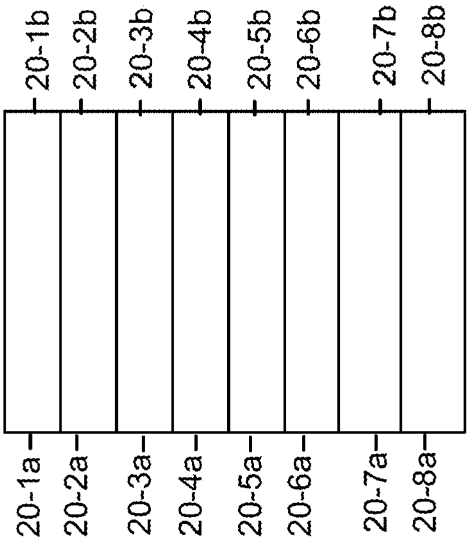

FIGS. 19 and 20 show examples of configurations of virtual routers in a Breakout Edge Data Center (BEDC) Direct Connect (DX) Virtual Private Cloud (VPC) in accordance with embodiments described herein. More particularly, FIGS. 19 and 20 show examples of configurations virtual router 1900, 2000-1, and 2000-2. As shown in FIGS. 19 and 20, the other virtual routers in the overlay network for the BEDC DX VPC are configured for various types of 5G traffic, including various types of 5G signaling traffic. Highest IP address is assigned as Secondary address serving as a default gateway. Second highest IP address is assigned to the Primary vRouter. Third highest IP address is assigned to the Secondary vRouter. For SMF/UPF, a single subnet is created as a first CIDR prefix while configured on 2 ENIs as a second CIDR prefix. These subnets are considered Point-to-Point, no default gateway is defined/required FIGS. 21A and 21B show examples of configurations of virtual routers in a Breakout Edge Data Center (BEDC) Direct Connect (DX) Virtual Private Cloud (VPC) in accordance with embodiments described herein. More particularly, FIGS. 19 and 20 show examples of configurations virtual router 2100-2, and 2000-1. As shown in FIGS. 21A and 21B, the other virtual routers in the overlay network for the BEDC DX VPC are configured for various types of 5G traffic, including various types of 5G signaling traffic. Highest IP address is assigned as Secondary address serving as a default gateway. Second highest IP address is assigned to the Primary vRouter. Third highest IP address is assigned to the Secondary vRouter. For SMF/UPF, a single subnet is created as a first CIDR prefix while configured on 2 ENIs as a second CIDR prefix. These subnets are considered Point-to-Point, no default gateway is defined/required.

Figure 22:
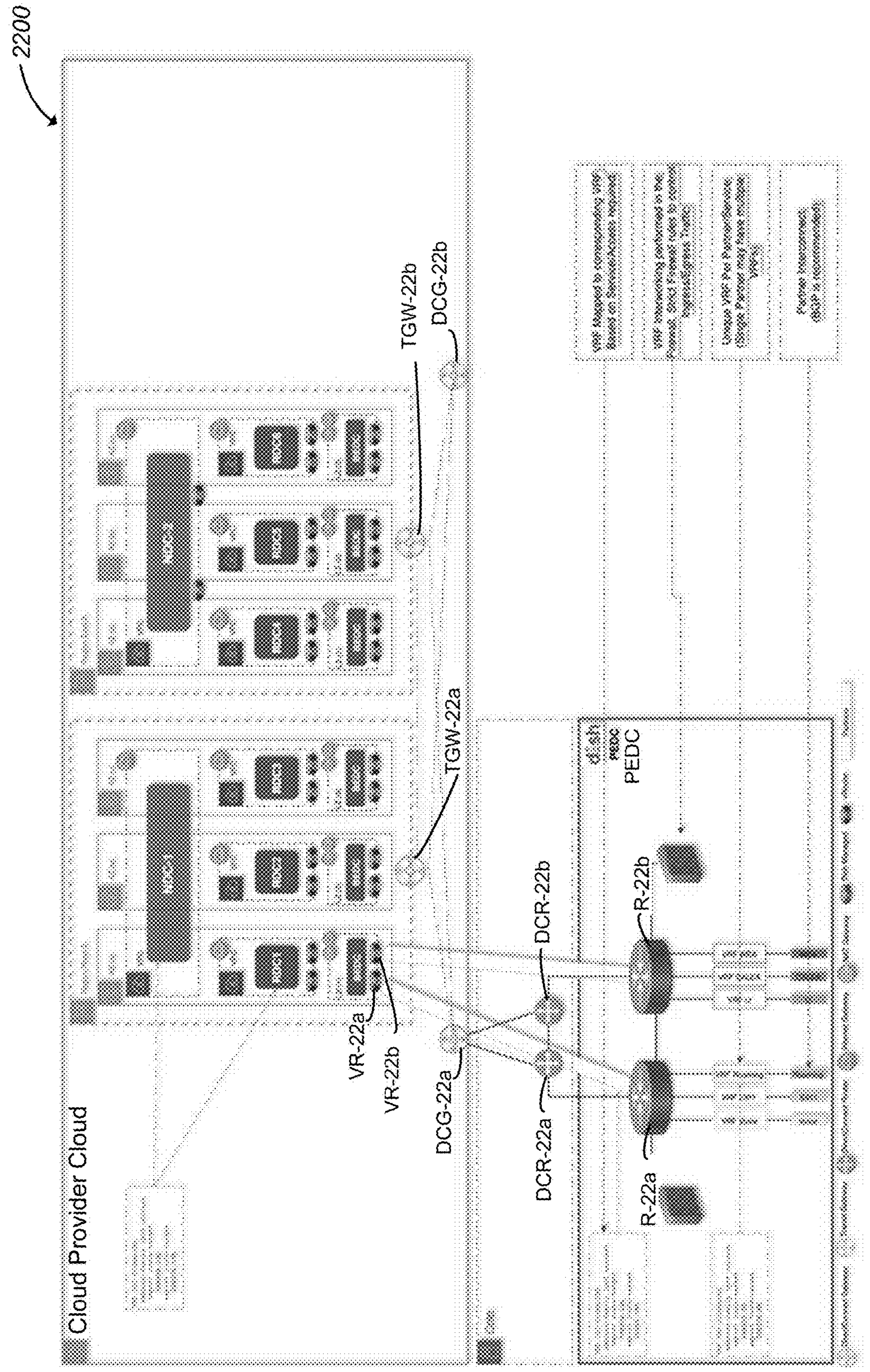
FIG. 22 shows an example of a portion of a network in accordance with embodiments described herein.

FIG. 22 shows an example of a portion of a network 2200 in accordance with embodiments described herein. The BEDC Internet VPC includes. As shown in FIG. 22, a transit gateway TGW-22*a* for provided a Region West-2. In a local zone LZ (1), virtual routers VR-22*a* and VR-22*b* are provided. The transit gateway TGW-22*a* is connected to a direct connect gateway DCG-22*a* and a direct connect gateway DCG-22-*b*, which is connected to a transit gateway TGW-22*b* for a Region East-2. The direct connect gateway DCG-22*a* is coupled to direct connect routers 22*a* and 22*b* in a PEDC. A VRF is mapped to a corresponding VRF based on Service/Access required. VRF interworking is performed in a firewall. Strict firewall rules are used to controls ingress/egress traffic. VRF are unique per partner/service, wherein single partners may have multiple VRFs. Partners may be interconnected via BGP.

Figure 23:
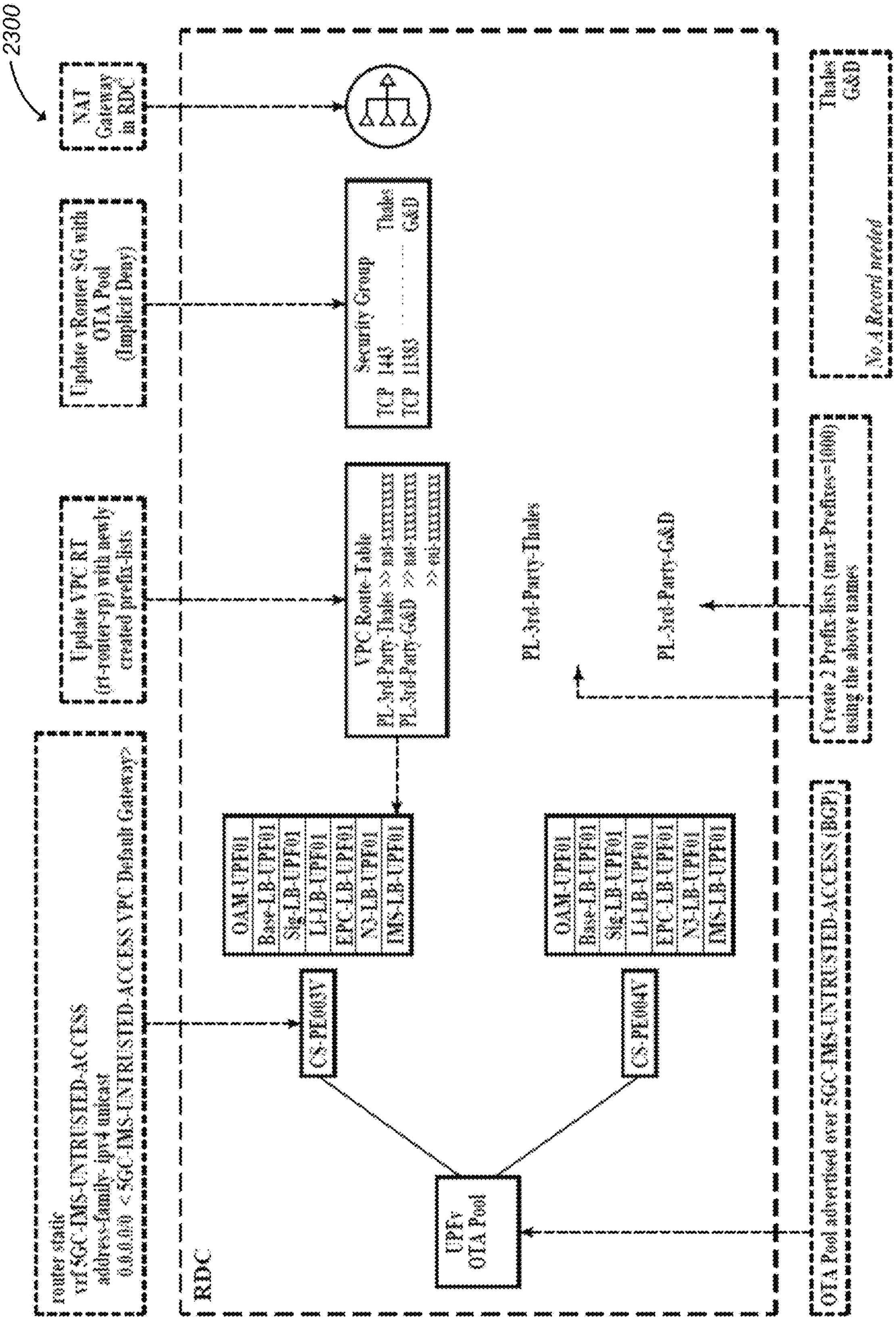
FIG. 23 shows a diagram of UPF for telephony voice functions interconnected to a virtual router, a Virtual Private Cloud router table, and a security group.

Referring now to FIG. 23, a virtual router underlay/overlay bridge system architecture is shown. In some embodiments of this 5G system architecture, a UPFv (User Plane Function for Voice) in the anchor point for telephony voice functions. In one or more aspects of some embodiments, the UPFv needs to communicate with the outside world (e.g., its telecommunication service provider) for data traffic such as push notifications, downloading of patches, and the like. However, the outside world is connected to the underlay network (i.e., the physical network responsible for the delivery of packets), not the overlay network (i.e., a virtual network that is built on top of an underlying network infrastructure).

Additionally, the UPFv has specific router requirements so it cannot directly connect to traditional physical routers on the underlay network. Instead, the UPFv only communicates with the Virtual Routers (i.e., the Overlay routers) where it establishes a routing protocol. Virtual Routers are typically only used as router functions on the virtual overlay network.

In some embodiments of the virtual router underlay/overlay bridge system and method, the virtual router is instructed to send transmission from the UPFv to an updated VPC router table on a cloud computing service provider to get to the physical underlay network. In this regard, the reconfigured virtual router acts as the bridge to the physical underlay network for the data traffic. Next, the data traffic travels to the virtual router Security Group from the updated VPC router table. Continuing, the data traffic then travels to a NAT Gateway in the Regional Data Center, and then finally to the Internet and the physical underlay network. In this regard, in some embodiments, the UPFv uses OTA (Over the Air) functions to access the physical underlay network and the outside world.

In a corresponding manner, the only way for data traffic to get to the UPFv from the physical underlay network, is through the Virtual Router on a reversed path. In this regard, the UPFv may be associated with an IP address (e.g., 10.124.0.0) that is used VPC router table on a cloud computing service provider to receive data traffic that is trying to reach the UPFv from the physical underlay network.

Figure 24:
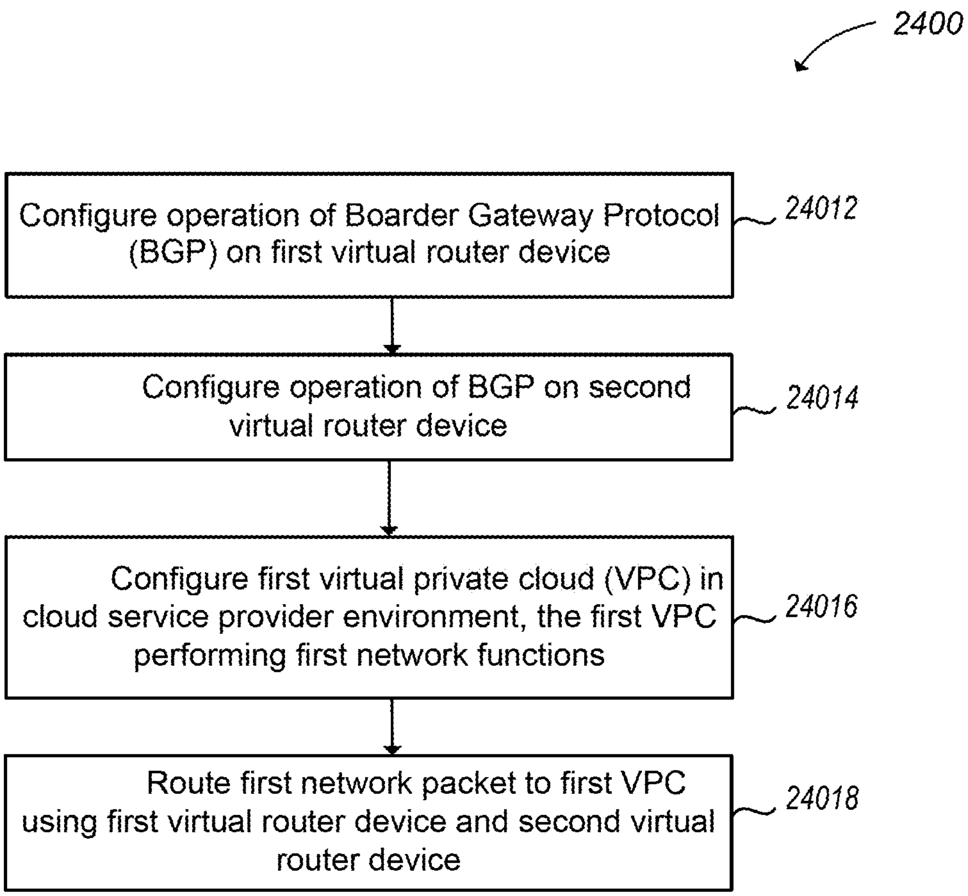
FIG. 24 illustrates a logical flow diagram showing an example embodiment of a process for connecting a plurality of router devices and a plurality of network functions of a fifth-generation New Radio (5G NR) cellular telecommunication network radio access network (RAN), the plurality of network functions provided in a cloud service provider environment.

FIG. 24 illustrates a logical flow diagram showing an example embodiment of a process 2400 for connecting a plurality of router devices and a plurality of network functions of a fifth-generation New Radio (5G NR) cellular telecommunication network radio access network (RAN), the plurality of network functions provided in a cloud service provider environment in accordance with embodiments described herein.

As an initial matter, Virtual routing and forwarding (VRF) is an IP-based computer network technology that enables the simultaneous co-existence of multiple virtual routers (vRouters) as instances or virtual router instances (VRIs) within the same router. One or multiple physical or logical interfaces may have a VRF; however, none of the VRFs share routes. Packets are forwarded only between interfaces on the same VRF. VRFs work on Layer 3 of the OSI model. Independent routing instances enable IP addresses users to be deployed that overlap or are the same without conflict. Because network paths may be segmented without multiple routers, network functionality improves, which one of the key benefits of virtual routing and forwarding.

VRFs are used for network isolation/virtualization at Layer 3 of the OSI model as VLANs serve similarly at Layer 2. Typically, VRFs may be implemented to separate network traffic and more efficiently use network routers. Virtual routing and forwarding can also create VPN tunnels to be solely dedicated to a single network or client. In various implementations, so-called "full VRF" is used, which focuses on labeling Layer 3 traffic via Multiprotocol Label Switching (MPLS) in a manner that is similar to Layer 2 Virtual Local Area Networks (VLANS). A MPLS cloud in a service provider cloud environment uses multiprotocol border gateway protocol (MP BGP). VRF isolates traffic from source to destination through that MPLS cloud. To separate overlapping routes and make use of common services, VRF incorporates Route Distinguishers (RDs) and Route Targets (RTs). A VPN routing and forwarding (VRF) instance, whether the default VRF or one specified by the user, always has a static route associated with it. Users can configure a default VRF static route in lieu of specifying a VRF, which allows a user to customize a static route in VRF configuration mode. VRF configurations enable multiple VPN environments to simultaneously co-exist in a router on the same physical network or infrastructure. This enables separated network services that reside in the same physical infrastructure to be invisible to each other, such as wireless, voice (VoIP), data, and video. VRFs can also be used for multiprotocol label switching or MPLS deployments.

To configure a VRF instance on a virtual router, command can be issued to a device that hosts the virtual router (e.g., a Cisco IOS command line interface). Initially, a VRF instance is created and an interface for the VRF space is created. A Session Initiation Protocol (SIP) adjacency address and a VLAN identifier are set. Finally, an Open Shortest Path First (OSPF) instance is created for the VRF.

Also, Border Gateway Protocol (BGP) is an exterior gateway protocol used to exchange routing and reachability information among autonomous systems (ASs). BGP used for routing within an autonomous system is called Interior Border Gateway Protocol, Internal BGP (iBGP). BGP runs between two peers in the same autonomous system. All iBGP peers within an AS must be fully meshed. Route reflectors (RR) can be used to get rid of the full-mesh of IBGP peers in a network. Rather than each BGP system having to peer with every other BGP system with the AS, each BGP speaker instead peers with a router reflector. Routing advertisements sent to the route reflector are then reflected out to all of the other BGP speakers.

Multiprotocol extended Border Gateway Protocol (MP-EBGP) is used in Cisco IOS routers. MP-BGP is an extended BGP that allows BGP to carry routing information for multiple network layer protocols, including IPv4 unicast, IPv4 multicast, IPv6 unicast, and IPv6 multicast. MP-BGP enables a unicast routing topology different from a multicast routing topology, which helps to control the network and resources.

MP-BGP is also used for MPLS VPN where MP-BGP is used to exchange the VPN labels. For each different "address" type, MP-BGP uses a different address family. Unlike older BGP, MP-BGP includes an Address Family Identifier (AFI), which specifies the address family, and a Subsequent Address Family Identifier (SAFI). MP-BGP routers can become neighbors using IPv4 addresses and exchange IPv6 prefixes or the other way around. An interface of a router is configured with information including neighbor identifier, an autonomous system Identifier, and an address-family identifier.

Generic routing encapsulation (GRE) is an IP encapsulation protocol which is used to transport IP packets over a network. (RFC 1701, RFC 2784, RFC 2890). GRE is a routing encapsulating protocol that can tunnel any Layer 3 protocol including IP. GRE protocol creates a point-to-point connection.

Referring once again to FIG. 24, the process 2400 begins at 2402. At 2402, a mobile network operator configures a plurality of first virtual routing and forwarding (VRF) instances on a first router device using information that identifies the plurality of network functions and information that identifies a plurality of Internet Protocol (IP) subnets.

At 2404, the mobile network operator configures a plurality of second VRF instances on a second router device using information that identifies the plurality of network functions and information that identifies the plurality of IP subnets.

At 2406, the mobile network operator controls a first virtual private cloud (VPC) in the cloud service provider environment, the first VPC performing a first network function.

At 2408, an on-premises router device transmits a first network packet to the first VPC using a first one of the first VRF instances and a first one of the second VRF instances.

Figure 25:
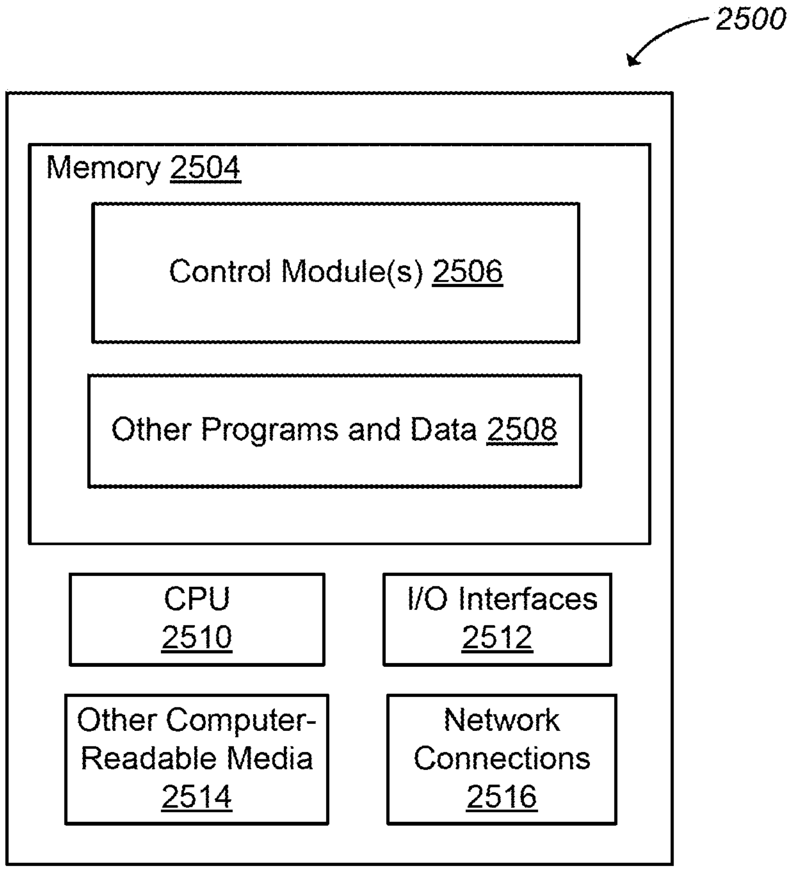
FIG. 25 is a block diagram of a computing device in accordance with embodiments described herein.

FIG. 25 shows a system diagram that describes an example implementation of a computing system or systems 2500 for implementing embodiments described herein.

The functionality described herein for enabling communications between a cloud service provider environment and a fifth-generation 5G NR cellular telecommunication network RAN, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 25 illustrates an example of underlying hardware on which such software and functionality may be hosted and/or implemented.

In particular, shown is example host computer system(s) 2500. For example, such computer system(s) 2500 may represent one or more of those in various data centers, base stations and cell sites shown and/or described herein that are, or that host or implement the functions of: routers, components, microservices, nodes, node groups, control planes, clusters, virtual machines, NFs, and other aspects described herein for enabling communications between a cloud service provider environment and a fifth-generation 5G NR cellular telecommunication network RAN. In some embodiments, one or more special-purpose computing systems may be used to implement the functionality described herein. Accordingly, various embodiments described herein may be implemented in software, hardware, firmware, or in some combination thereof. Host computer system(s) 2500 may include memory 2504, one or more central processing units (CPUs) 2510, I/O interfaces 2516, other computer-readable media 2514, and network connections 2516.

Memory 2504 may include one or more various types of non-volatile and/or volatile storage technologies. Examples of memory 2504 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 2504 may be utilized to store information, including computer-readable instructions that are utilized by CPU 2510 to perform actions, including those of embodiments described herein.

Memory 2504 may have stored thereon control module(s) 2506. The control module(s) 1804 may be configured to implement and/or perform some or all of the functions of the systems, components and modules described herein for CU-UP and CU-CP standby pods in a cloud-native 5G wireless telecommunication network. Memory 2504 may also store other programs and data 2508, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 2516 are configured to communicate with other computing devices to facilitate the functionality described herein. In various embodiments, the network connections 2516 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 2516 may include a video interfaces, other data input or output interfaces, or the like. Other computer-readable media 2514 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for connecting a plurality of router devices and a plurality of network functions of a fifth-generation New Radio (5G NR) cellular telecommunication network radio access network (RAN), the plurality of network functions provided in a cloud service provider environment, the method comprising:

- configuring, by a mobile network operator, a plurality of Boarder Gateway Protocol (BGP) route reflectors to be fully meshed across a plurality of regions in the cloud service provider environment, including:
  - configuring a first BGP route reflector of the plurality of BGP route reflectors and a second BGP route reflector of the plurality of BGP route reflectors to be located in a first region of the plurality of regions; and
  - configuring a third BGP route reflector of the plurality of BGP route reflectors and a fourth BGP route reflector of the plurality of BGP route reflectors to be located in a second region of the plurality of regions;
- configuring, by the mobile network operator, operation of BGP on a first virtual router device in the cloud service provider environment, including:
  - peering the first virtual router device with a first BGP route reflector of the plurality of BGP route reflectors;
- configuring, by the mobile network operator, operation of BGP on a second virtual router device in the cloud service provider environment, the second virtual router device being separate from the first virtual router device, including:
  - peering the second virtual router device with a second BGP route reflector of the plurality of BGP route reflectors, the second BGP route reflector being separate from the first BGP route reflector;
- configuring, by the mobile network operator, a first virtual private cloud (VPC) in the cloud service provider environment, the first VPC performing a first one of the network functions; and
- routing a first network packet to the first VPC using the first virtual router device and the second virtual router device.

2. The method of claim 1 wherein the first one of the network functions performed by the first VPC is a User Plane Function (UPF).

3. The method of claim 1 wherein the first one of the network functions performed by the first VPC is an Access and Mobility Management Function (AMF).

4. The method of claim 1 wherein the first one of the network functions performed by the first VPC is a Session Management Function (SMF).

5. The method of claim 1 wherein the first BGP route reflector is associated with a first Availability Zone (AZ) of the first region in the cloud service provider environment, and the second BGP route reflector is associated with a second AZ of the second region in the cloud service provider environment.

6. The method of claim 1 wherein the first BGP route reflector in the cloud service provider environment serves as a route-reflector to a Passthrough Edge Data Center (PEDC) that operates as a route reflector client to a market of the 5G NR cellular telecommunication network RAN.

7. A system for connecting a plurality of router devices and a plurality of network functions of a fifth-generation New Radio (5G NR) cellular telecommunication network radio access network (RAN), the plurality of network functions provided in a cloud service provider environment, the system comprising:

- at least one memory that stores computer executable instructions; and
- at least one processor that executes the computer executable instructions to cause actions to be performed, the actions including:
  - operate Boarder Gateway Protocol (BGP) on a first virtual router device;
  - operate BGP on a second virtual router device;
  - operate a plurality of Boarder Gateway Protocol (BGP) route reflectors that are fully meshed across a plurality of regions in the cloud service provider environment, a first BGP route reflector of the plurality of BGP route reflectors and a second BGP route reflector of the plurality of BGP route reflectors to be located in a first region of the plurality of regions, a third BGP route reflector of the plurality of BGP route reflectors and a fourth BGP route reflector of the plurality of BGP route reflectors to be located in a second region of the plurality of regions, wherein the first virtual router device is peered with the first BGP route reflector, and wherein the second virtual router device is peered with the second BGP route reflector, the second BGP route reflector being separate from the first BGP route reflector;

operate a first virtual private cloud (VPC) in the cloud service provider environment, the first VPC performing a first one of the network functions; and route a first network packet to the first VPC using the first virtual router device and the second virtual router device.

8. The system of claim 7 wherein the first one of the network functions performed by the first VPC is a User Plane Function (UPF).

9. The system of claim 7 wherein the wherein the first one of the network functions performed by the first VPC is an Access and Mobility Management Function (AMF).

10. The system of claim 7 wherein the first one of the network functions performed by the first VPC is a Session Management Function (SMF).

11. The system of claim 7 wherein the first BGP route reflector is associated with a first Availability Zone (AZ) of the first region in the cloud service provider environment, and the second BGP route reflector is associated with a second AZ of the first region in the cloud service provider environment.

12. A non-transitory computer-readable storage medium having computer-executable instructions stored thereon that, when executed by at least one processor, cause the at least one processor to cause actions to be performed, the actions including:

configure Boarder Gateway Protocol (BGP) on a first virtual router device;

configure BGP on a second virtual router device;

configure a plurality of Boarder Gateway Protocol (BGP) route reflectors to be fully meshed across a plurality of regions in the cloud service provider environment, including:

configure a first BGP route reflector of the plurality of BGP route reflectors to peer the first virtual router device in a first region of the plurality of regions;

configure a second BGP route reflector of the plurality of BGP route reflectors to peer the second virtual router device in a first region of the plurality of regions; and configure a third BGP route reflector of the plurality of BGP route reflectors and a fourth BGP route reflector of the plurality of BGP route reflectors in a second region of the plurality of regions;

configure a first virtual private cloud (VPC) in a cloud service provider environment, the first VPC performing a first one of a plurality of network functions of a fifth-generation New Radio (5G NR) cellular telecommunication network radio access network (RAN); and cause a first network packet to be routed to the first VPC using the first virtual router device and the second virtual router device.

13. The computer-readable storage medium of claim 12 wherein the first one of the network functions performed by the first VPC is a User Plane Function (UPF).

* * * * *